(12) United States Patent
Plechey et al.

(10) Patent No.: US 11,731,605 B2
(45) Date of Patent: Aug. 22, 2023

(54) BRACKET FOR A DISTRIBUTOR VALVE

(71) Applicant: Westinghouse Air Brake Technologies Corporation, Wilmerding, PA (US)

(72) Inventors: Michael S. Plechey, Jeannette, PA (US); Jeffrey B. Skweres, McKeesport, PA (US)

(73) Assignee: WESTINGHOUSE AIR BRAKE TECHNOLOGIES CORPORATION, Wilmerding, PA (US)

(*) Notice: Subject to any disclaimer, the term of this patent is extended or adjusted under 35 U.S.C. 154(b) by 726 days.

(21) Appl. No.: 16/717,435

(22) Filed: Dec. 17, 2019

(65) Prior Publication Data

US 2020/0189551 A1 Jun. 18, 2020

Related U.S. Application Data

(60) Provisional application No. 62/780,551, filed on Dec. 17, 2018.

(51) Int. Cl.
| | | |
|---|---|---|
| *B60T 17/04* | (2006.01) | |
| *B60T 15/02* | (2006.01) | |
| *F16J 15/08* | (2006.01) | |
| *F16J 15/02* | (2006.01) | |
| *B60T 13/36* | (2006.01) | |

(52) U.S. Cl.
CPC .......... *B60T 17/046* (2013.01); *B60T 15/021* (2013.01); *F16J 15/02* (2013.01); *F16J 15/0818* (2013.01); *B60T 13/365* (2013.01)

(58) Field of Classification Search
CPC ........ B60T 15/02; B60T 15/021; B60T 17/04; B60T 17/046
See application file for complete search history.

(56) References Cited

U.S. PATENT DOCUMENTS 4,033,632 A * 7/1977 Wilson .................... B60T 15/18
303/74
5,451,099 A * 9/1995 Hart ........................ B60T 15/42
303/33

(Continued)

FOREIGN PATENT DOCUMENTS

| KR | 1020050122702 A | 12/2005 | |
|---|---|---|---|
| RU | 2758226 C2 | 10/2021 | |
| WO | WO-2012038284 A2 * | 3/2012 | ............ B60T 17/046 |

OTHER PUBLICATIONS

Translation of WO2012038284A2. (Year: 2012).*
(Continued)

*Primary Examiner* — Thomas J Williams
(74) *Attorney, Agent, or Firm* — The Small Patent Law Group LLC; William Breeze

(57) ABSTRACT

A pipe bracket for a brake distributor valve for a vehicle includes a pipe bracket body including a main portion mounting face to receive the main portion of the distributor valve, a main-line portion mounting face to receive the main-line portion of the distributor valve, and an attachment face configured to secure the pipe bracket to a vehicle. The main portion mounting face defines a signal port in fluid communication with the signal passageway of the main portion. The main-line portion mounting face defines a signal port in fluid communication with the signal passageway of the main-line portion.

18 Claims, 17 Drawing Sheets

(56) References Cited

U.S. PATENT DOCUMENTS

| | | | |
|---|---|---|---|
| 5,480,218 A * | 1/1996 | Hart | B60T 17/043 |
| | | | 137/594 |
| 5,509,727 A * | 4/1996 | Hart | B60T 15/42 |
| | | | 303/3 |
| 5,559,281 A * | 9/1996 | McKay | B60T 17/228 |
| | | | 73/39 |
| 5,634,696 A * | 6/1997 | Hart | F16L 39/00 |
| | | | 303/63 |
| 5,695,258 A * | 12/1997 | Reid | B60T 17/043 |
| | | | 303/3 |
| 5,988,766 A * | 11/1999 | McCurdy, Jr. | B60T 17/04 |
| | | | 303/3 |
| 6,439,354 B2 | 8/2002 | Fukuda | |
| 10,214,195 B1 * | 2/2019 | Skweres | B60T 17/04 |
| 10,654,461 B2 * | 5/2020 | Plechey | B60T 15/021 |
| 2017/0170339 A1 | 6/2017 | Ootor et al. | |
| 2018/0170339 A1 * | 6/2018 | Plechey | B60T 17/04 |

OTHER PUBLICATIONS

Office Action dated Dec. 29, 2021 for corresponding Russian Patent application No. 2019141843 (4 pages).
English translation of the Office Action dated Dec. 29, 2021 for corresponding Russian Patent application No. 2019141843 (3 pages).
Search Report dated Dec. 27, 2021 for corresponding Russian Patent application No. 2019141843 (2 pages).
English translation of the Search Report dated Dec. 27, 2021 for corresponding Russian Patent application No. 2019141843 (2 pages).
Office Action dated Feb. 20, 2020 for corresponding Russian Patent application No. 2019141843 (3 pages).
English translation of the Office Action dated Feb. 20, 2020 for corresponding Russian Patent application No. 2019141843 (2 pages).

* cited by examiner

BRACKET FOR A DISTRIBUTOR VALVE

CROSS-REFERENCE TO RELATED APPLICATIONS

This application claims priority to U.S. Provisional Application No. 62/780,551, which was filed on 17 Dec. 2018, and the entire disclosure of which is incorporated herein by reference.

BACKGROUND

Technical Field

Embodiments of the invention relate to a distributor valve and a pipe bracket for the distributor valve.

Discussion of Art

Vehicles have brake systems. With regard to railroad freight cars, these have a brake pipe that runs through each rail or freight car and is coupled therebetween to extend continuously the length of the train. The brake pipe is charged with compressed air by a compressor on a locomotive. The compressed air may provide the pneumatic brake force at the respective cars and serves as a communication link via which the car's brakes may be controlled by increasing and decreasing the brake pipe pressure. Brake equipment for railroad freight cars utilizes control valves, also known as distributor valves, to control the operation of the brake cylinders and brakes for the cars.

Referring to FIG. 1, a prior art distributor valve unit 1 for a freight car used in some regions or countries, for example Russia, includes a main portion 2, a pipe bracket or chamber 3, and a main-line portion 4. The pipe bracket 3 is the central portion to which the main portion 2 and the main-line portion 4 are each mounted to form the distributor valve unit. In a conventional freight pneumatic braking system, there are five different operating pressures required for proper operation of the entire distributor valve unit to ensure proper pneumatic braking of a freight vehicle including: brake pipe, reservoir, working chamber, valve chamber, and brake cylinder, which are depicted via a legend in FIG. 1. The pipe bracket 3 houses a working chamber 5 and a valve chamber 6. The pipe bracket 3 is in fluid communication with a reservoir 7 and a brake cylinder 8.

On some vehicles, for example vehicles operated in Russia, the control valves do not include a service accelerated release (SAR) valve function. Without the SAR valve function, the overall length of a vehicle (e.g., a train) may be practically limited. The SAR valve function allows the brake pipe of the vehicle to be recharged faster, may provide a reduction in the time to release a service application of the brakes, and ensures a positive release of the brakes in freight cars located in the rear of the vehicle. With current freight brake operation on vehicles operated in effecting a full and timely release of the brake of the freight cars may be problematic when controlling the vehicle from the head end. It may be desirable to have a system and method that differs from those that are currently available.

BRIEF DESCRIPTION

In accordance with one embodiment, a pipe bracket for a brake distributor valve can include a pipe bracket body including a main portion mounting face may receive a main portion of the distributor valve. A main-line portion mounting face may receive a main-line portion of the distributor valve. An attachment face may secure the pipe bracket to a vehicle. The main portion mounting face may define a first signal port that may be in fluid communication with a first signal passageway of the main portion. The main-line portion mounting face may define a second signal port that may be in fluid communication with a second signal passageway of the main-line portion In accordance with one embodiment, a brake distributor valve for a vehicle includes a main portion may include a first brake pipe passageway, a first signal passageway, a first reservoir passageway, a first working chamber passageway, a first valve chamber passageway, a first brake cylinder passageway, and a first additional discharge channel passageway. A main-line portion may include a second brake pipe passageway, a second signal passageway, a second working chamber passageway, a second valve chamber passageway, and a second additional discharge channel passageway. A pipe bracket body may include a main portion mounting face to receive the main portion of the distributor valve, a main-line portion mounting face to receive the main-line portion of the distributor valve, and an attachment face to secure the pipe bracket to the vehicle. The main portion mounting face may define a first brake pipe port in fluid communication with the first brake pipe passageway of the main portion, a first signal port to be in fluid communication with the first signal passageway of the main portion, a first reservoir port to be in fluid communication with the first reservoir passageway of the main portion, a first working chamber port to be in fluid communication with the first working chamber passageway of the main portion, a first valve chamber port to be in fluid communication with the first valve chamber passageway of the main portion, a first brake cylinder port to be in fluid communication with the first brake cylinder passageway of the main portion, and a first additional discharge channel port to be in fluid communication of the additional discharge passageway of the main portion. The main-line portion mounting face may define a second brake pipe port to be in fluid communication with the second brake pipe passageway of the main-line portion, a second signal port to be in fluid communication with the second signal passageway of the main-line portion, a second working chamber port to be in fluid communication with the second working chamber passageway of the main-line portion, a second valve chamber port to be in fluid communication with the second valve chamber passageway of the main-line portion, and a second additional discharge channel port to be in fluid communication of the second additional discharge passageway of the main-line portion.

In accordance with one embodiment, a gasket for a distributor valve for a vehicle may include a first region to seal and isolate a signal port of a pipe bracket when a main portion or a main-line portion of the distributor valve is connected to a main portion mounting face or a main-line portion, respectively, of the pipe bracket.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the subject matter described herein relate to a bracket for a distributor valve of a vehicle that may provide a service accelerated release function to distributor valves that do not currently include such a function. The bracket may be provided between a main portion and a main-line portion of a brake distributor valve. Suitable vehicles may include rail vehicles, mining equipment, marine vessels, and on-road vehicles such as automobiles and trucks. For illustration, embodiments will be described using rail vehicles as examples.

A suitable bracket may be a pipe bracket. The pipe bracket may be compatible with current brake distributor valves that do not include a service accelerated release function. The pipe bracket includes an attachment face to secure the pipe bracket to a vehicle and a main portion mounting face to receive the main portion and a main-line portion mounting face to receive the main-line portion of current brake distributor valves without a service accelerated release function.

Gaskets may seal and isolate the ports at the main portion mounting face and the main-line portion mounting face. This may be when the pipe bracket has been connected to the main portion and main-line portion of a brake distributor valve. The valve may not include a service accelerated release function. The gaskets for one type of brake distributor valve may include raised sections. These raised portions may isolate and seal the ports of the pipe bracket when connected to the distributor valve. The gaskets for another type of brake distributor valve include regions separated by raised beads or ribs to isolate and seal the ports of the pipe bracket.

For purposes of the description, spatial orientation terms, if used, shall relate to the referenced embodiment as it may be oriented in the accompanying drawing figures or otherwise described in the following detailed description. However, the embodiments described hereinafter may assume alternative variations and embodiments. The specific devices illustrated in the accompanying drawing figures and described herein may be simply exemplary and should not be considered as limiting.

Figure 1:
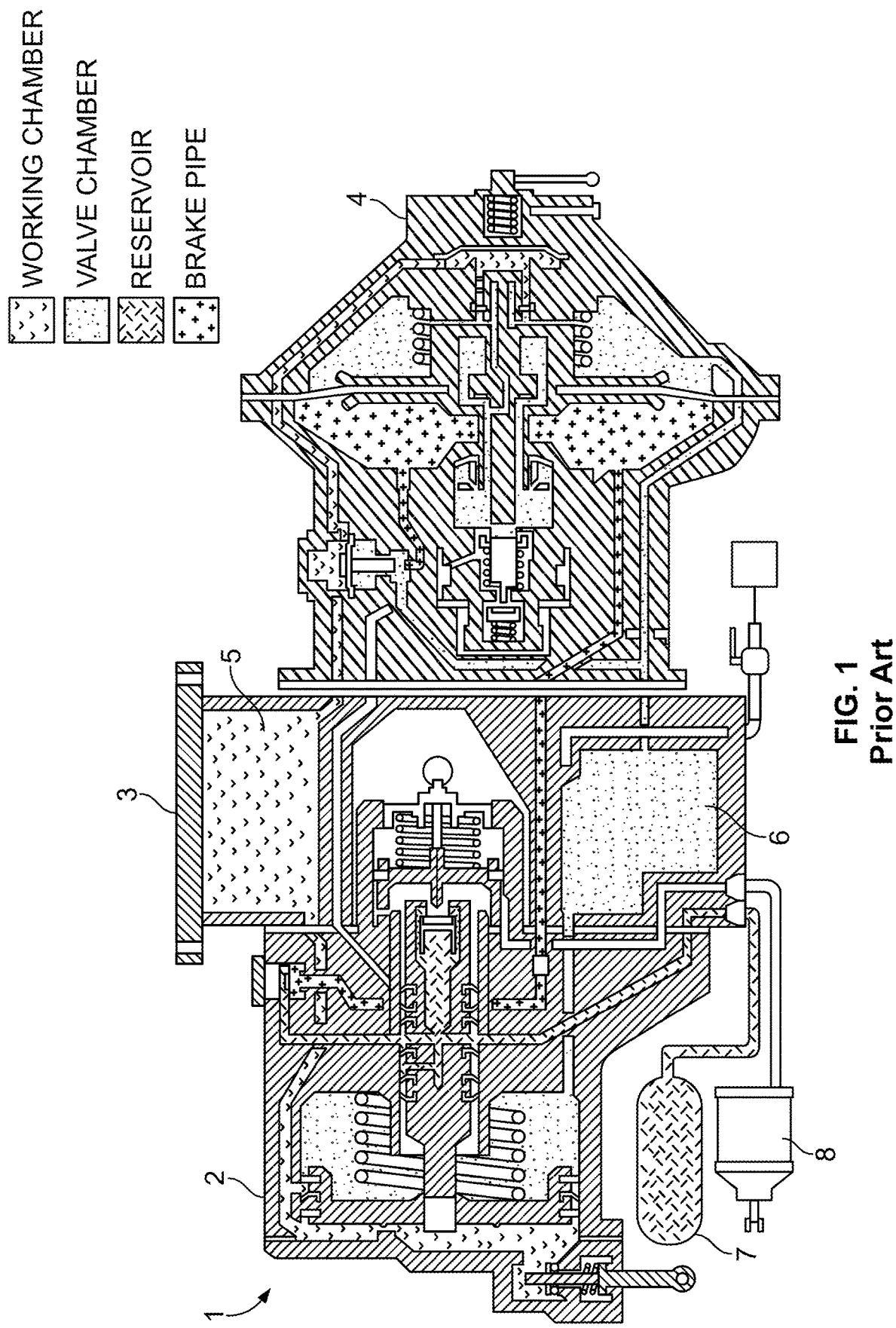
FIG. 1 is a cross-sectional view of a prior art distributor valve.
Figure 2:
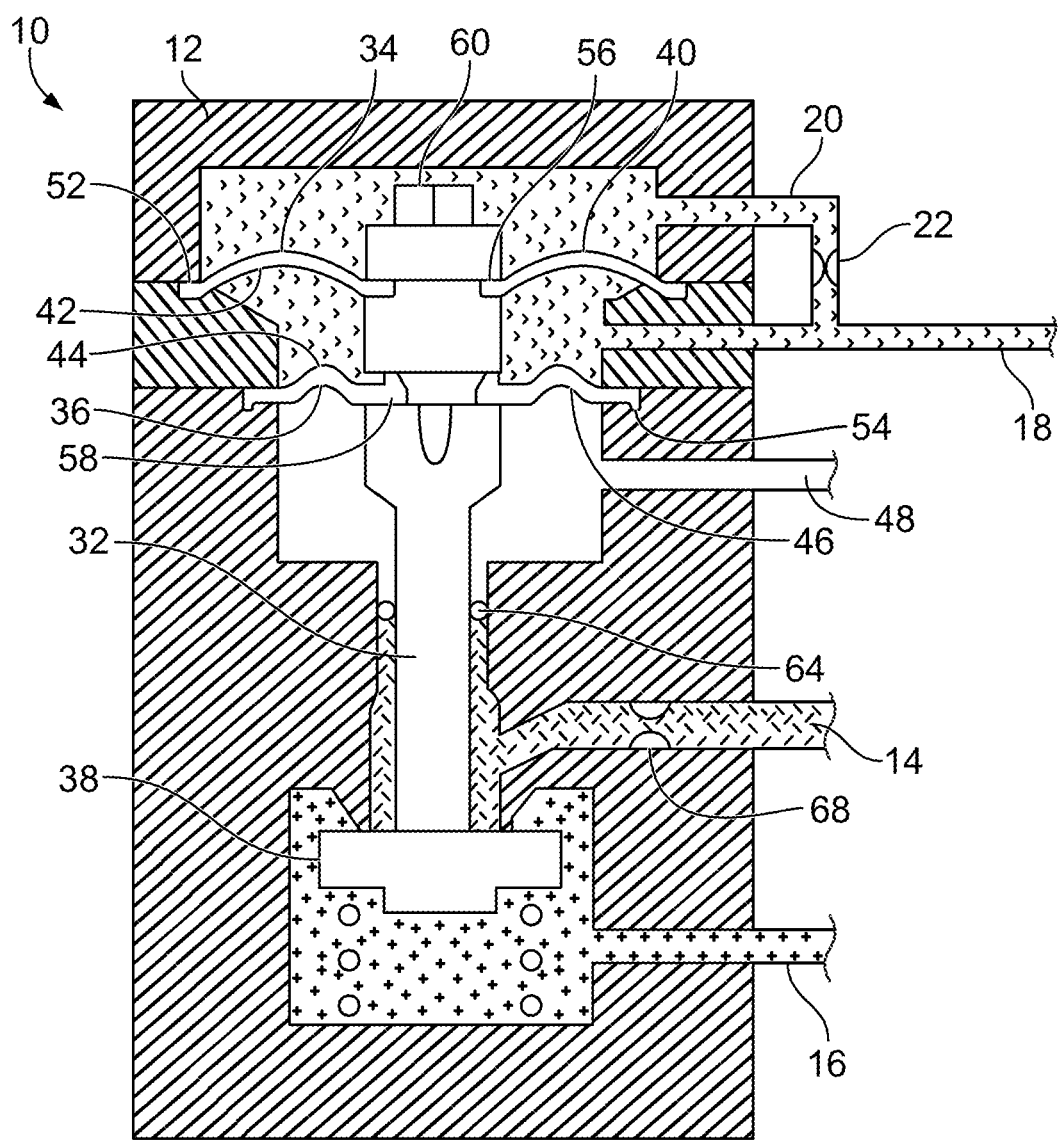
FIG. 2 is a schematic view of a service accelerated release valve according to one embodiment.
Figure 3:
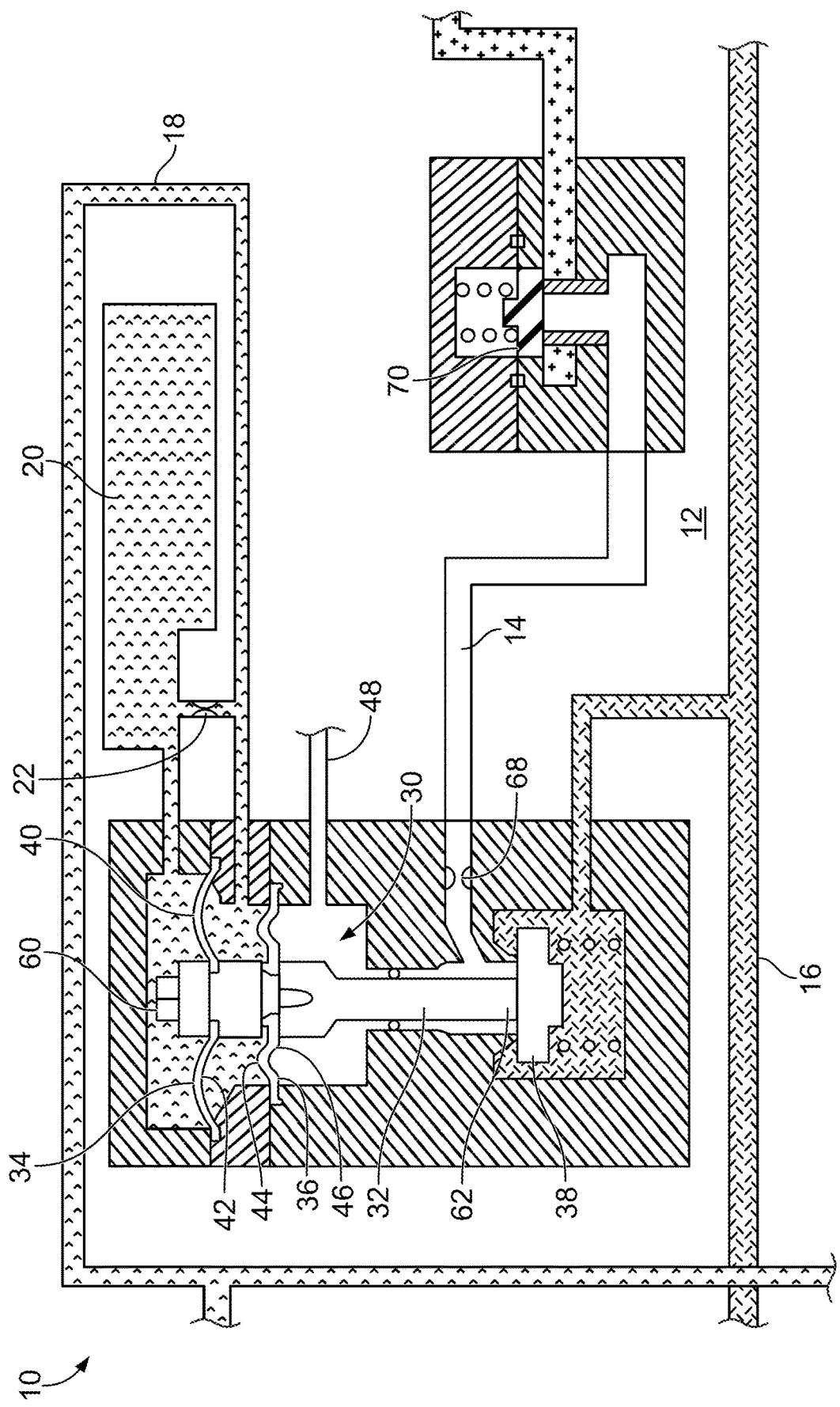
FIG. 3 is a schematic view of the service accelerated release valve of FIG. 2, further showing a back-flow check valve.

Referring to FIGS. 2 and 3, a brake distributor valve 10 for a vehicle according to one embodiment includes a body 12 defining a brake pipe passageway 14 in fluid communication with a brake pipe, a reservoir passageway 16 may be in fluid communication with a reservoir, a working chamber passageway 18 in fluid communication with a working chamber, and a working chamber reservoir 20 in fluid communication with the working chamber passageway 18 via a choke 22. As shown in FIG. 1, the working chamber 5 may be typically provided in the pipe bracket 3, although other suitable arrangements may be utilized. The brake distributor valve 10 further includes a service accelerated release (SAR) valve 30 (FIG. 3). The SAR valve 30 includes a valve member 32 having a first position where the brake pipe passageway 14 may be isolated from the reservoir passageway 16 and a second position where the brake pipe passageway 14 may be in fluid communication with the reservoir passageway 16. The valve member 32 may supply pressure from the reservoir passageway 16 to the brake pipe passageway 14 during a brake release event. The valve member 32 may be actuated between the first and second positions based on a pressure differential between the working chamber passageway 18 and the working chamber reservoir 20.

Referring still to FIGS. 2 and 3, the working chamber passageway 18 and the working chamber reservoir 20 act as a reference pressure to determine when the valve member 32 may be actuated between the first and second positions. More specifically, the SAR valve 30 includes a first diaphragm 34, a second diaphragm 36, and a SAR check valve 38. The working chamber reservoir 20 may be in fluid communication with a first side 40 of the first diaphragm 34 and the working chamber passageway 18 may be in fluid communication with a second side 42 of the first diaphragm 34 and a first side 44 of the second diaphragm 36. The valve member 32 of the service accelerated release valve 30 moves from the first position to the second position based on a pressure differential between the working chamber passageway 18 and the working chamber reservoir 20. The valve member 32 may open the SAR check valve 38 when the valve member 32 moves from the first position to the second position to place the reservoir passageway 16 in fluid communication with the brake pipe passageway 14. A second side 46 of the second diaphragm 36 may be in fluid communication with ambient atmosphere via an exhaust passageway 48.

Outer portions 52, 54 of the first and second diaphragms 34, 36 may be connected to the body 12 with inner portions 56, 58 of the first and second diaphragms 34, 36 connected to the valve member 32. The first and second diaphragms 34, 36 may be provided at a first end 60 of the valve member 32 with a second end 62 of the valve member 32 engaging the SAR check valve 38. The valve member 32 includes an O-ring 64 that engages the body 12 to isolate the reservoir and brake pipe passageways 14, 16 from the exhaust passageway 48. When the pressure of the working chamber reservoir 20 may be greater than the pressure within the working chamber passageway 18, a pressure differential between the first and second sides 40, 42 of the first diaphragm 34 causes the valve member 32 to move from the first position to the second position with the second end 62 of the valve member 32 engaging and opening the SAR check valve 38 to place the reservoir passageway 16 in fluid communication with the brake pipe passageway 14. A choke 68 controls the flow from the reservoir passageway 16 to the brake pipe passageway 14. The choke 22 between the working chamber reservoir 20 and the working chamber passageway 18 controls the time the service accelerated release valve 30 may be open. The service accelerated release valve 30 may be incorporated into a main portion of the distributor valve 10.

Referring to FIG. 3, the distributor valve 10 further includes a back-flow check valve 70 in fluid communication with the reservoir passageway 16 when then the SAR check valve 38 may be in the open position. The back-flow check valve 70 may prevent flow of air from the brake pipe to the reservoir. The back-flow check valve 70 may be provided along the brake pipe passageway 14 of the body 12 such that, when the SAR check valve 38 may be open, air flowing from the reservoir passageway 16 causes the back-flow check valve 70 to open thereby allowing air to flow from the reservoir to the brake pipe. Providing air from the reservoir to the brake pipe increases the pressure within the brake pipe to reduce the service brake release times and ensures the positive release of the brakes in freight cars located in the rear of a train. Accordingly, the service accelerated release valve 30 and the back-flow check valve 70 work together to perform the accelerated release function.

The distributor valve 10, particularly the main-line portion, may include a direct release mode (plain mode) and a graduated release mode (hilly mode). In the direct release mode, the brake cylinder pressure exhausts to atmosphere during release of the brakes and the pressure within the working chamber decreases and equalizes with the brake pipe and valve chamber pressures during the release operation. In the graduated release mode, the brake cylinder pressure exhausts a predetermined amount depending upon how much brake pipe pressure may be increased with the working chamber pressure being fully retained and not decreasing during the release operation. The SAR valve 30 will allow reservoir pressure to flow into the brake pipe during a recharge when the distributor valve 10 may be in the direct release mode to aid in the recharge of brake pipe through the vehicle. This feature may be nullified when the distributor valve 10 may be in graduated release mode. Thus, the SAR valve 30 will provide for shorter brake pipe recharge times and faster brake releases when the distributor valve 10 may be in direct release mode.

During charging, brake pipe pressure flowing to the SAR valve 30 first flows to the top side of the back-flow check valve 70, which may be closed because of the spring force blocking the brake pipe pressure from flowing through to the SAR valve 30. At the same time, the pressure from the reservoir flows via the reservoir passageway 16 to the bottom side of the SAR check valve 38, which may be closed due to the spring force of the SAR check valve 38. While the SAR check valve 38 may be closed, the reservoir pressure cannot flow past the seat into the brake pipe passageway 14. Unrestricted (no choke) working chamber 18 air flows to the SAR valve 30 into a port feeding the second side 42 of the first diaphragm 34 and the first side 44 of the second diaphragm 36. The working chamber air also flows through the choke 22 into the working chamber reservoir 20 and through a port feeding the first side 40 of the first diaphragm 34. Once fully charged, the working chamber pressure may be equal on the first and second sides 40, 42 of the first diaphragm 34 and on the first side 44 of the second diaphragm 36. The spring force from the SAR check valve 38 and the pressure from the reservoir via the reservoir passageway 16 hold the SAR check valve 38 on its seat to keep the SAR valve 30 in the first position. The spring force of the SAR check valve 38 must be strong enough to keep the SAR check valve 38 closed in all working chamber, reservoir, and brake pipe pressure conditions.

During brake pipe reductions, the choke 22 between the working chamber passageway 18 and the working chamber reservoir 20 may be large enough to not create a sufficient pressure differential between the working chamber passageway 18 and the working chamber reservoir 20 to open the SAR valve 30.

During brake releases, with the distributor valve 10 or main-line portion of the distributor valve 10 in direct release mode, the drop in working chamber pressure creates a pressure differential between the working chamber passageway 18 and the working chamber reservoir 20 due to the choke 22, which causes the pressure acting on the first side 40 of the first diaphragm 34 to be larger than the pressure acting on the second side 42 of the first diaphragm 34. This pressure differential causes the valve member 32 of the SAR valve 30 to move downward from the first position to the second position, which causes the SAR check valve 38 to open thereby allowing pressure from the reservoir via the reservoir passageway 16 to flow to the brake pipe passageway 14 and to the back-flow check valve 70. Because the reservoir pressure may be higher than brake pipe pressure, at this time, the reservoir pressure will lift the back-flow check valve 70 off of its seat and allow reservoir pressure to flow directly back into the brake pipe. If the reservoir pressure was lower than the brake pipe pressure, the SAR release valve 30 would still move to the second position to open the SAR check valve 38, although the back-flow check valve 70 would not open due to the brake pipe pressure acting on the top of the back-flow check valve 70 being higher than the reservoir pressure. Once the reservoir pressure almost equalizes with brake pipe pressure, the back-flow check valve 70 will close thereby preventing the flow of reservoir pressure to the brake pipe. The valve member 32 of the SAR valve 30 will also move back from the second position to the first position when the differential between the working chamber passageway 18 and the working chamber reservoir 20 equalizes to allow the spring force from the SAR check valve 38 to move the valve member 32 upwards.

During brake releases with the distributor valve 10 in graduated release mode, the working chamber pressure does not drop until the distributor valve 10 goes to full release, which occurs when the brake pipe pressure reaches, for example, approximately 2.7 psi below the full recharge pressure setting of the system. Because the pressure within the working chamber reservoir 20 and the working chamber passageway 18 does not drop, a pressure differential between the working chamber passageway 18 and the working chamber reservoir 20 may be not created across the choke 22 such that the valve member 32 of the service accelerated release valve 30 will not move from the first position to the second position.

Referring to FIGS. 4-7, a brake distributor valve 110 for a vehicle according to one embodiment includes a body 112 defining a brake pipe passageway 114 in fluid communication with a brake pipe, a reservoir passageway 116 in fluid communication with a reservoir, and a brake cylinder exhaust passageway 118 in fluid communication with the exhaust port of valve 208 (FIG. 6), which may be discussed below. The brake distributor valve 110 further includes a SAR release valve 130. The SAR valve 130 includes a valve member 132 having a first position where the brake pipe passageway 114 may be isolated from the reservoir passageway 116 and a second position where the brake pipe passageway 114 may be in fluid communication with the reservoir passageway 116. The valve member 132 may supply pressure from the reservoir passageway 116 to the brake pipe passageway 114 during a brake release event. The valve member 132 may be actuated between the first and second positions based on a pressure within the brake cylinder exhaust passageway 118.

Referring still to FIGS. 4-7, the brake cylinder exhaust passageway 118 may be in fluid communication with ambient atmosphere via a choke 134. The SAR valve 130 includes a diaphragm 136 and a SAR check valve 138. The valve member 132 may open the SAR check valve 138 when the valve member 132 moves from the first position to the second position to place the reservoir passageway 116 in fluid communication with the brake pipe passageway 114. The body 112 also defines a signal passageway 140 in fluid communication with a signal pressure source. In one embodiment, the signal pressure source may be brake pipe pressure, although other suitable pressure sources and arrangements may be utilized. The brake distributor valve 110 further includes a switching valve 144 having a first position where the SAR valve 130 may be enabled and a second position where the SAR valve 130 may be disabled. The switching valve 144 may be moveable between the first and second positions in response to the signal pressure source. The body 112 also defines a switching passageway 146 in fluid communication with a second side 148 of the diaphragm 136 of the SAR valve 130. The body 112 further defines an exhaust passageway 150 in fluid communication with ambient atmosphere. When the switching valve 144 may be in the first position, the switching passageway 146 may be in fluid communication with the exhaust passageway 150. When the switching valve 144 may be in the second position, the switching passageway 146 may be in fluid communication with the brake pipe passageway 114. The switching valve 144 includes a spool valve 152 having a diaphragm 154 with the signal passageway 140 in fluid communication with a first side 156 of the diaphragm 154 of the switching valve 144.

As discussed above in connection with the distributor valve 10 shown in FIGS. 2 and 3, the distributor valve 110 of FIGS. 4-7 includes a direct release mode and a graduated release mode. When the distributor valve 110 may be in direct release mode, the signal pressure source may be fed to the signal passageway 140 and to the first side 156 of the diaphragm 154 of the switching valve 144 causing the spool valve 152 to move downward to block the connection of the brake pipe passageway 114 to the second side 148 of the diaphragm 136 of the SAR valve 130. With the distributor valve 110 in direct release mode and with the spool valve 152 in the first position, the second side 148 of the diaphragm 136 of the service accelerated release valve 130 may be connected to ambient atmosphere via the exhaust passageway 150 to allow the SAR valve 130 to be piloted by the brake cylinder exhaust pressure via the brake cylinder exhaust passageway 118, as discussed in more detail below. When the distributor valve 110 may be in graduated release mode, the signal pressure source may be not fed to the signal passageway 140 such that a switching spring 160 forces the spool valve 152 upward to the second position to place the switching passageway 146 in fluid communication with the brake pipe passageway 114. With the spool valve 152 in the second position, brake pipe pressure may be fed to the second side 148 of the diaphragm 136 of the SAR valve 130 via the switching passageway 146 to disable the function of the service accelerated release valve 130.

Figure 6:
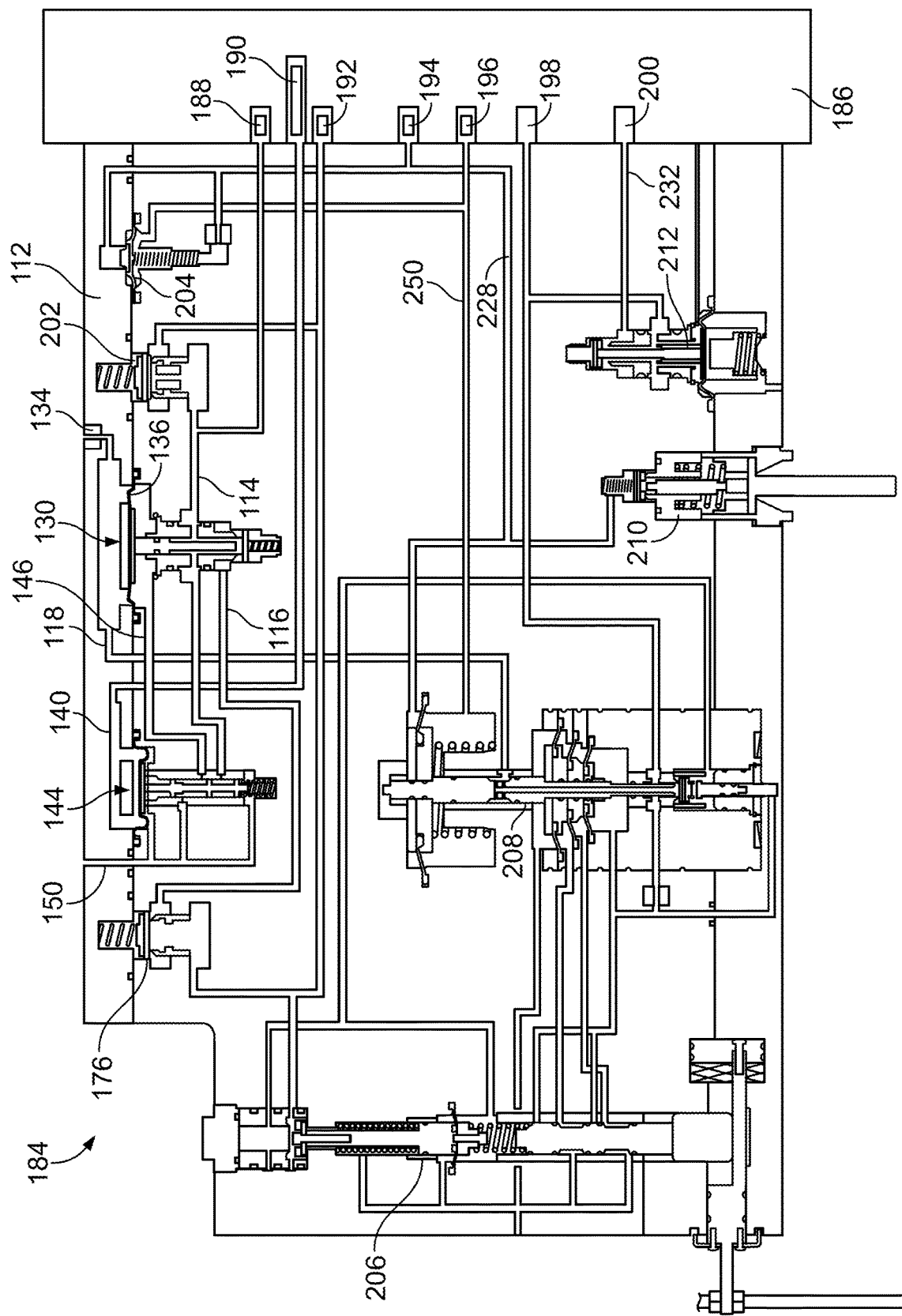
FIG. 6 is a schematic view of a main portion of a distributor valve according to one embodiment.
Figure 7:
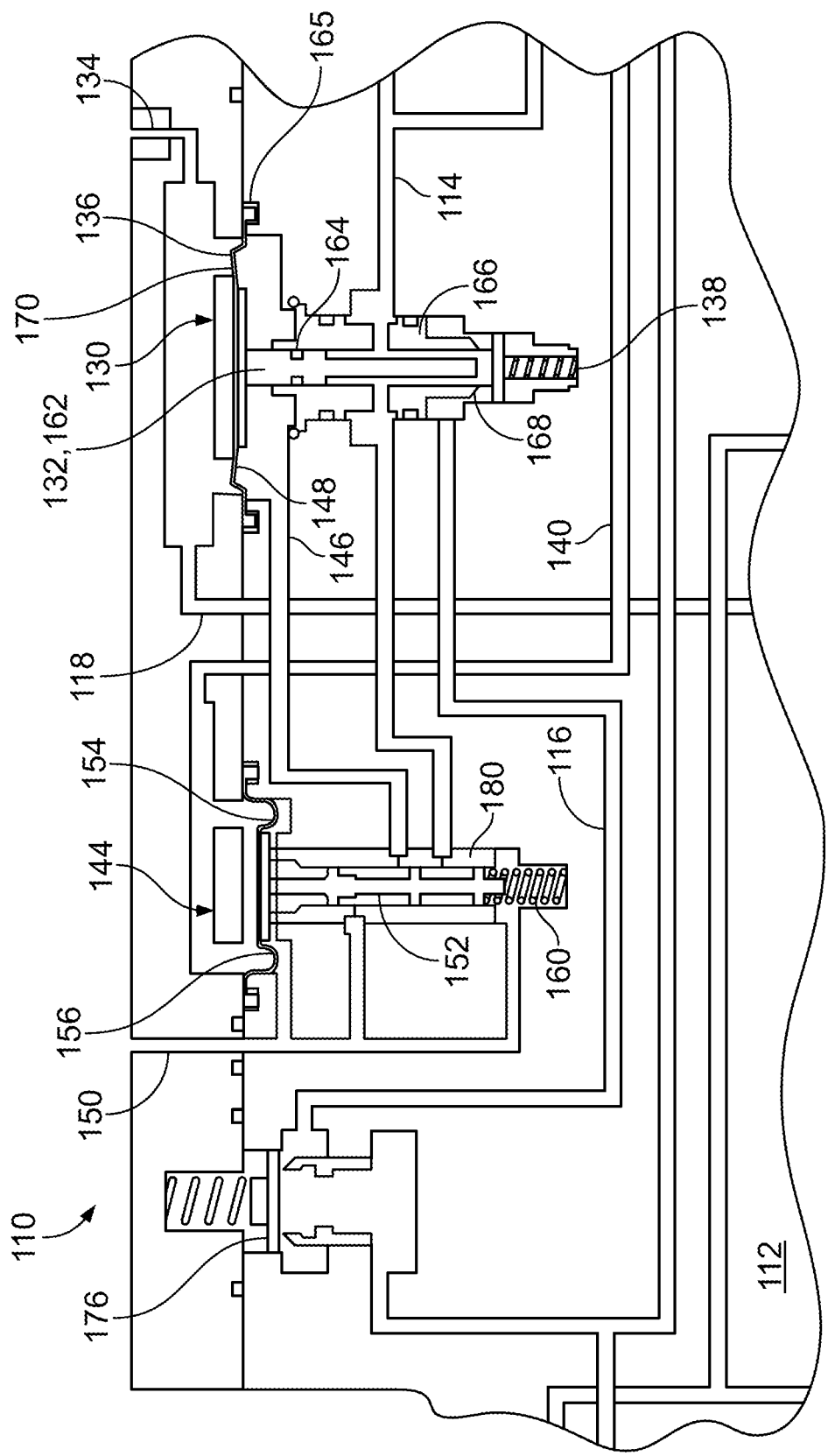
FIG. 7 is an enlarged view of the main portion of FIG. 6.
Figure 8:
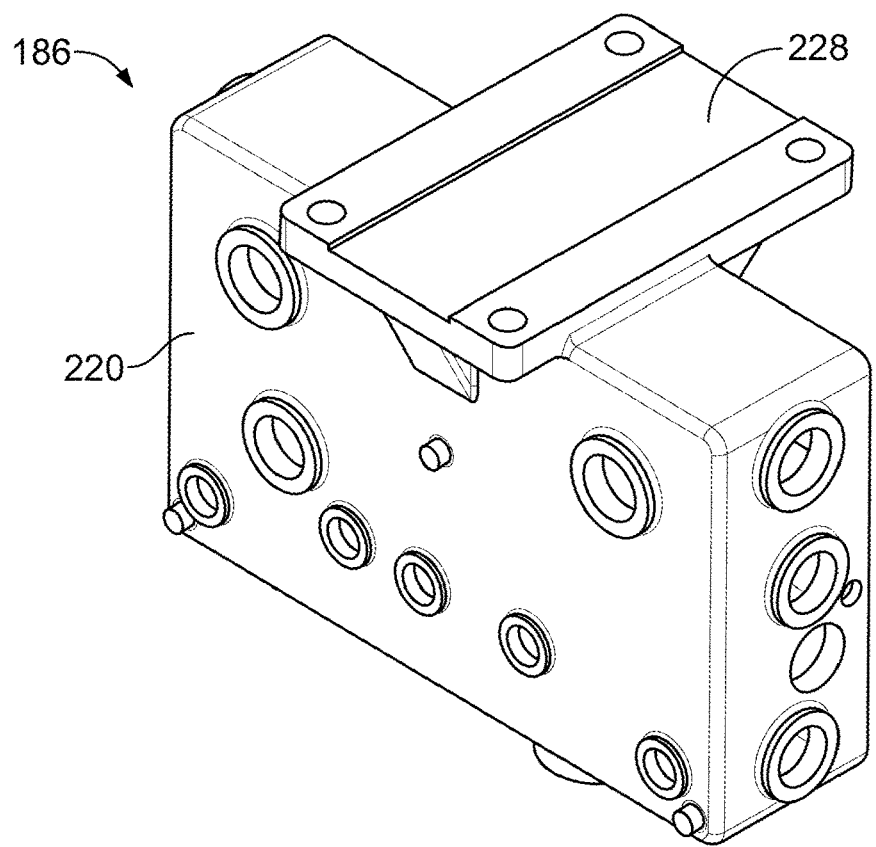
FIG. 8 is a rear perspective view of a pipe bracket for a brake distributor valve according to one embodiment
Figure 9:
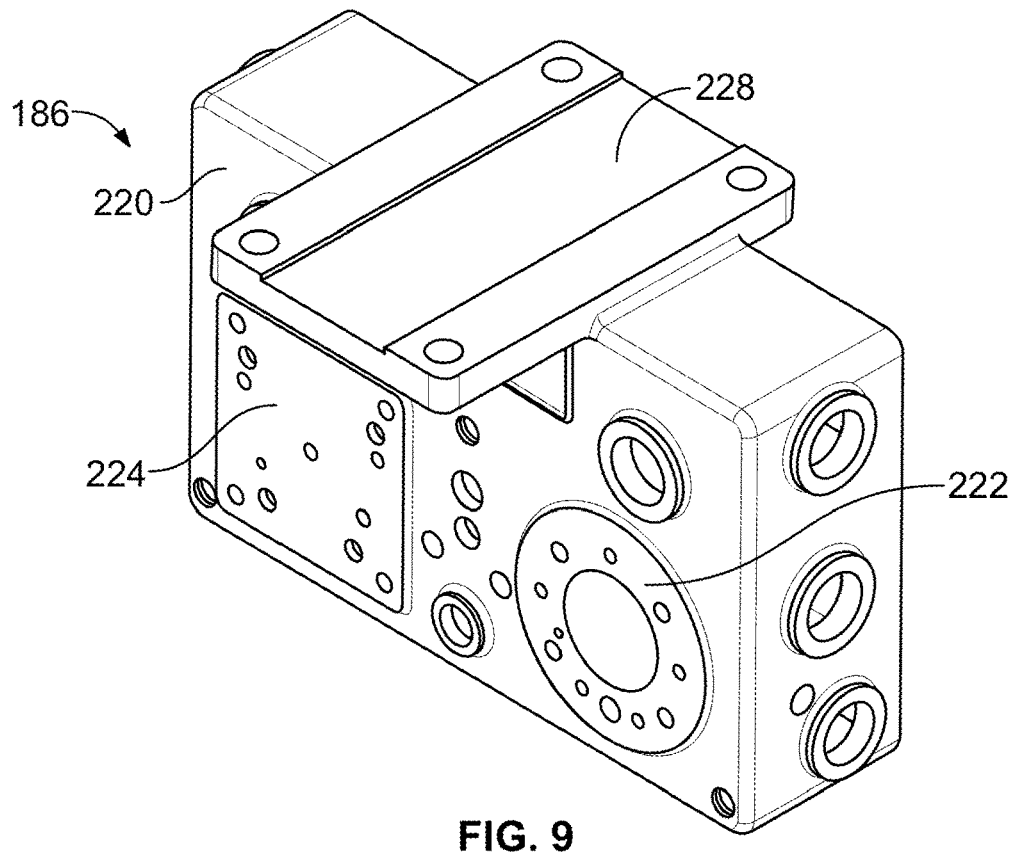
FIG. 9 is a front perspective view of the pipe bracket of FIG. 8.
Figure 10:
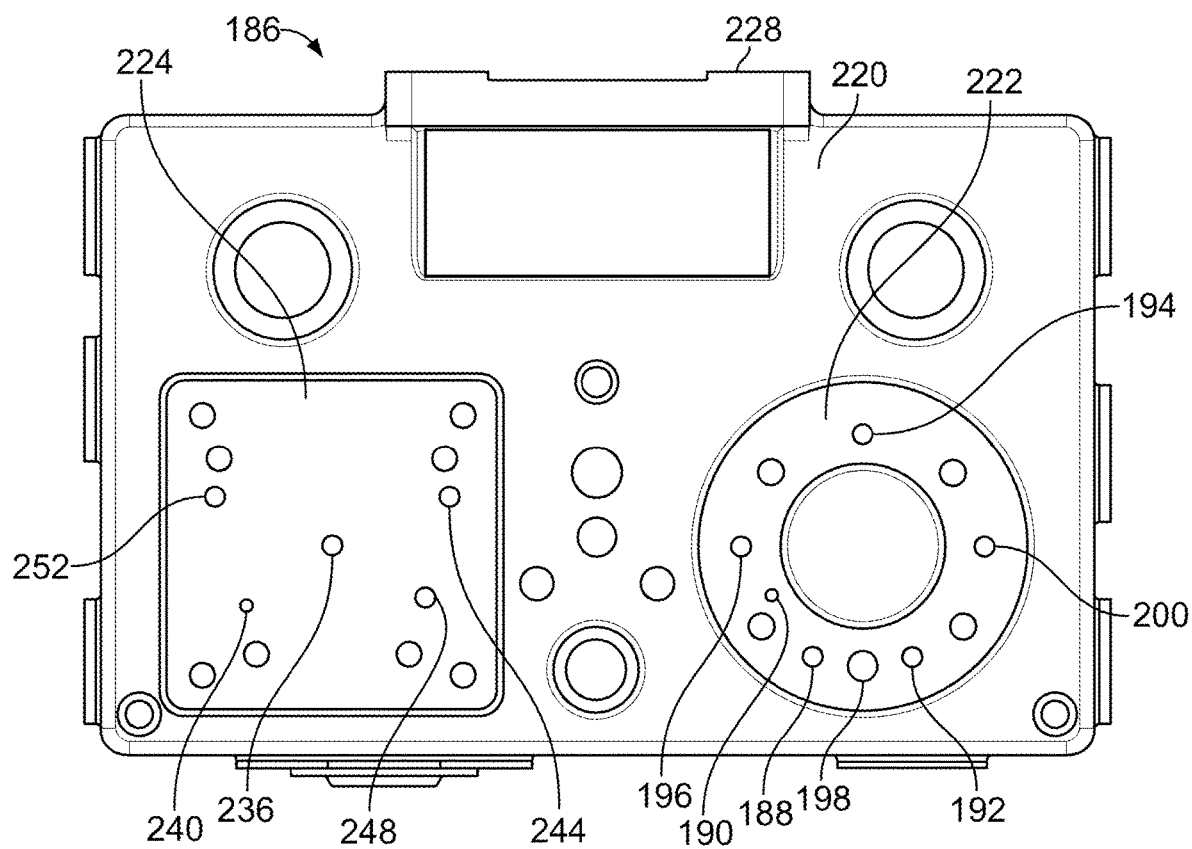
FIG. 10 is a front view of the pipe bracket of FIG. 8
Figure 11:
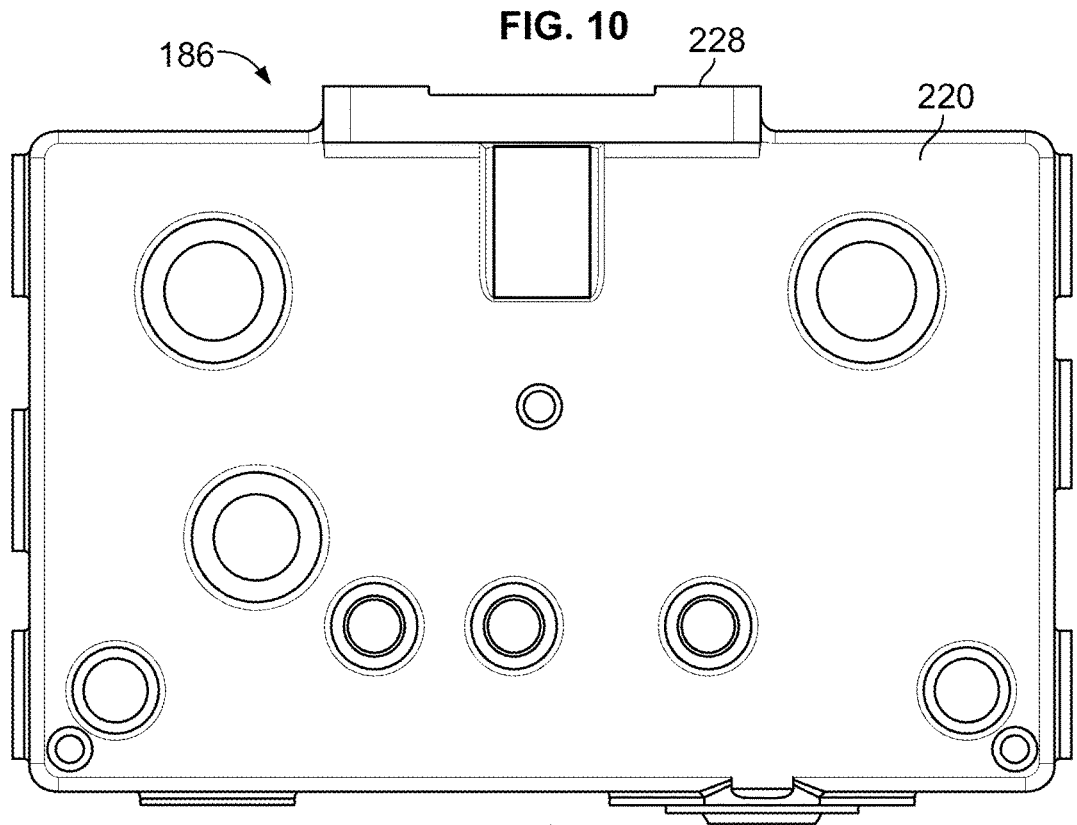
FIG. 11 is a rear view of the pipe bracket of FIG. 8.
Figure 12:
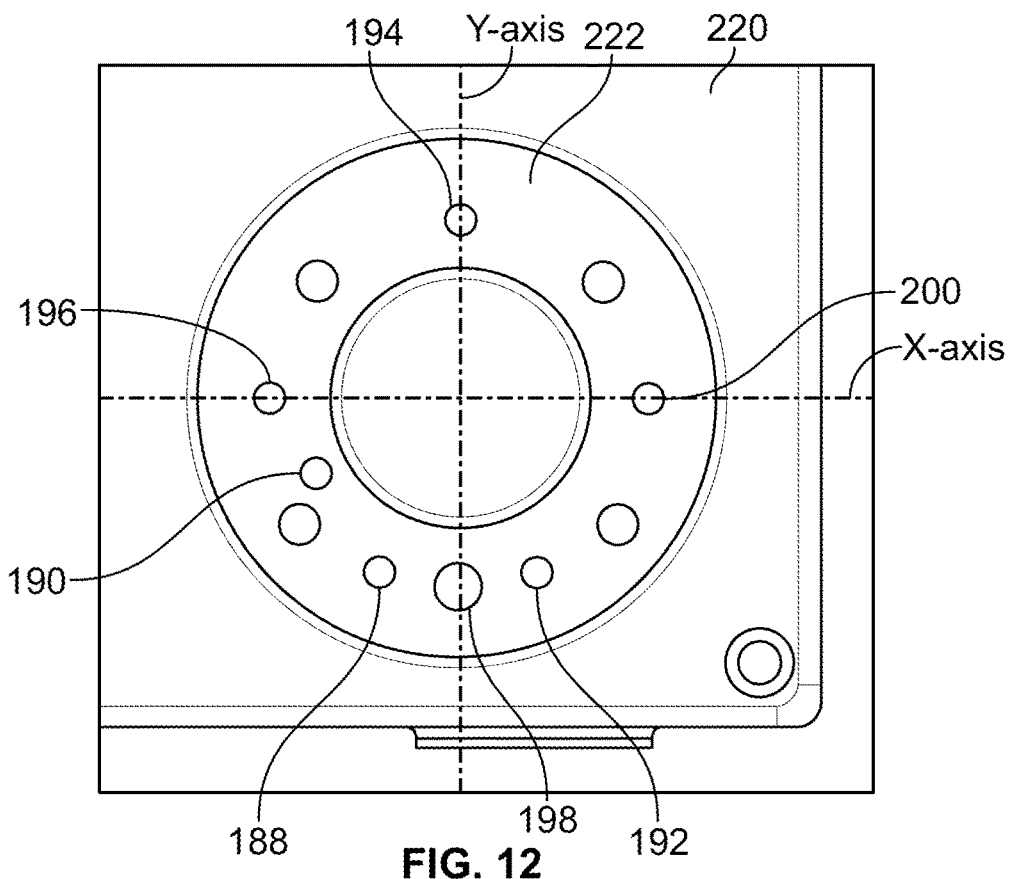
FIG. 12 is a front view of a main portion mounting face of the pipe bracket of FIG. 8.
Figure 13:
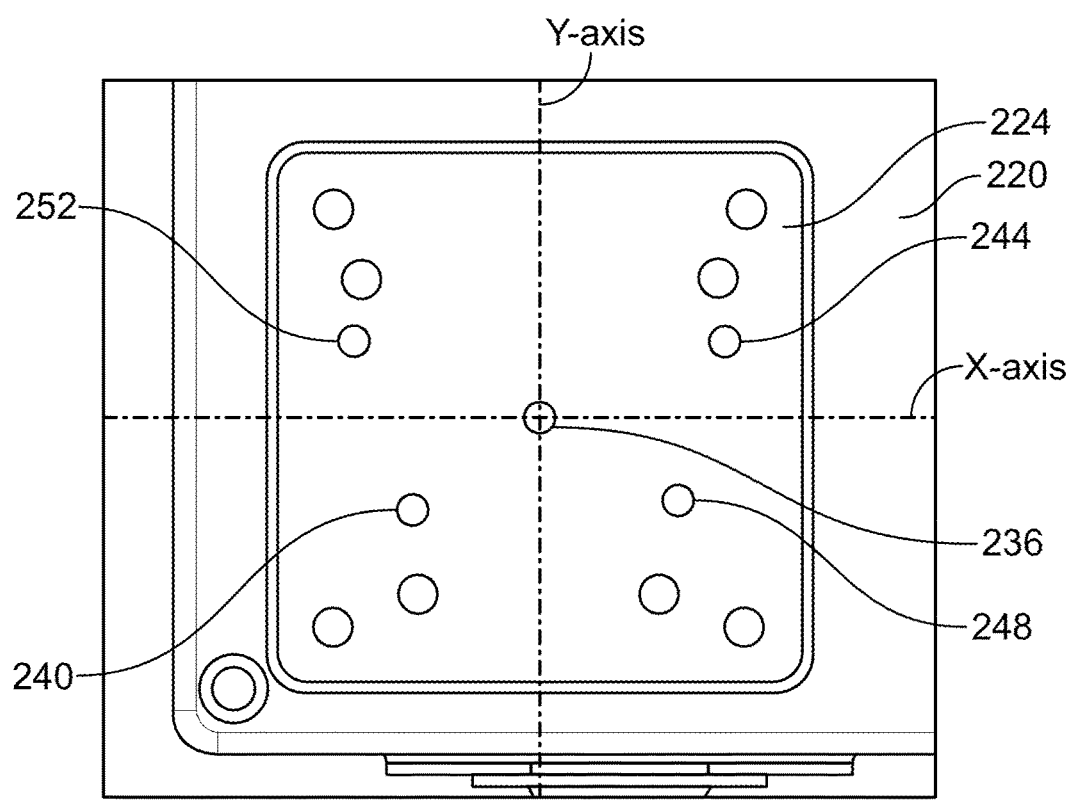
FIG. 13 is a front view of a main-line portion mounting face of the pipe bracket of FIG. 8.
Figure 14:
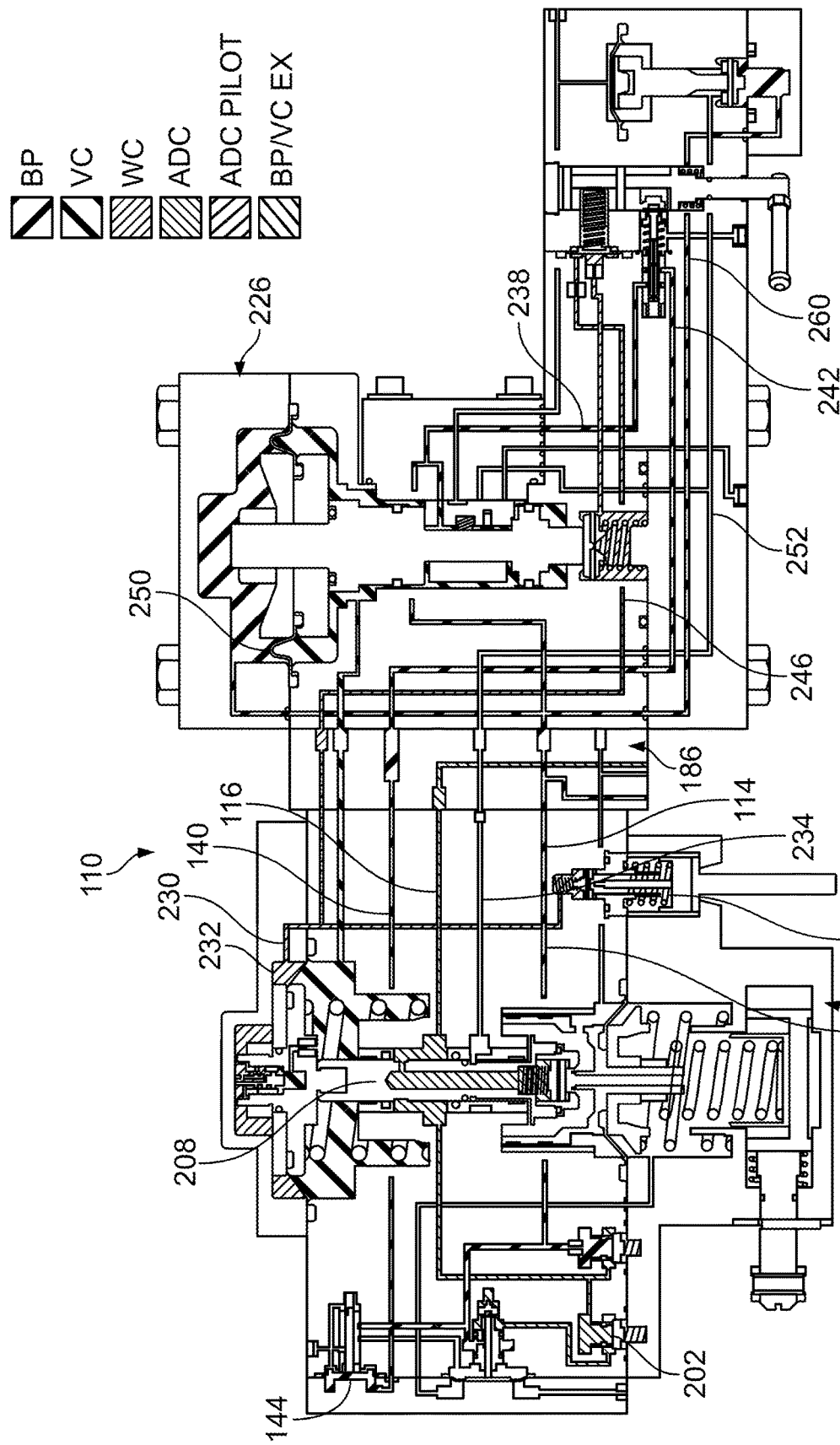
FIG. 14 is a schematic view of a brake distributor valve according to one embodiment.
Figure 15:
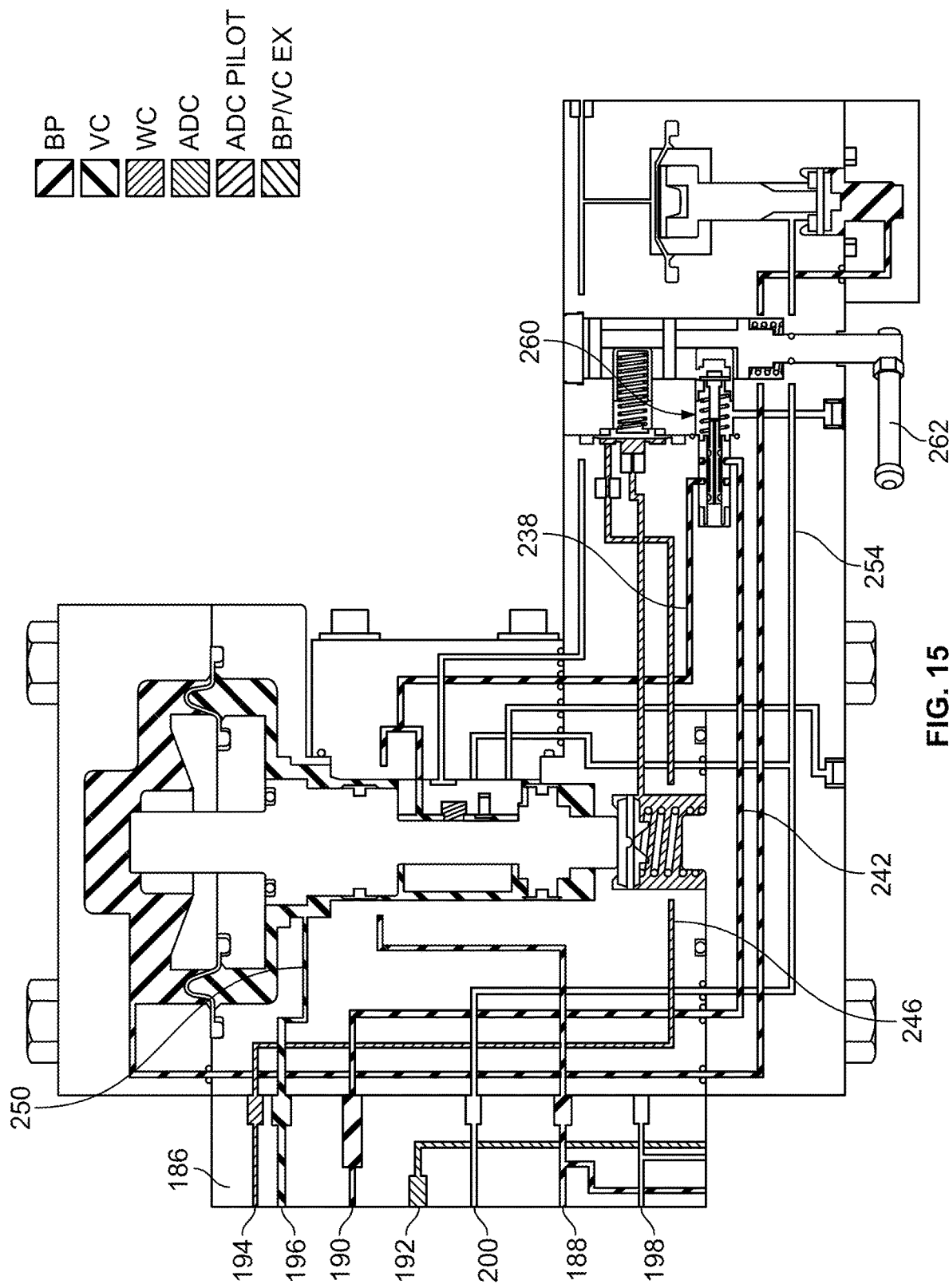
FIG. 15 is a schematic view of a main-line portion of the brake distributor valve of FIG. 14.
Figure 16:
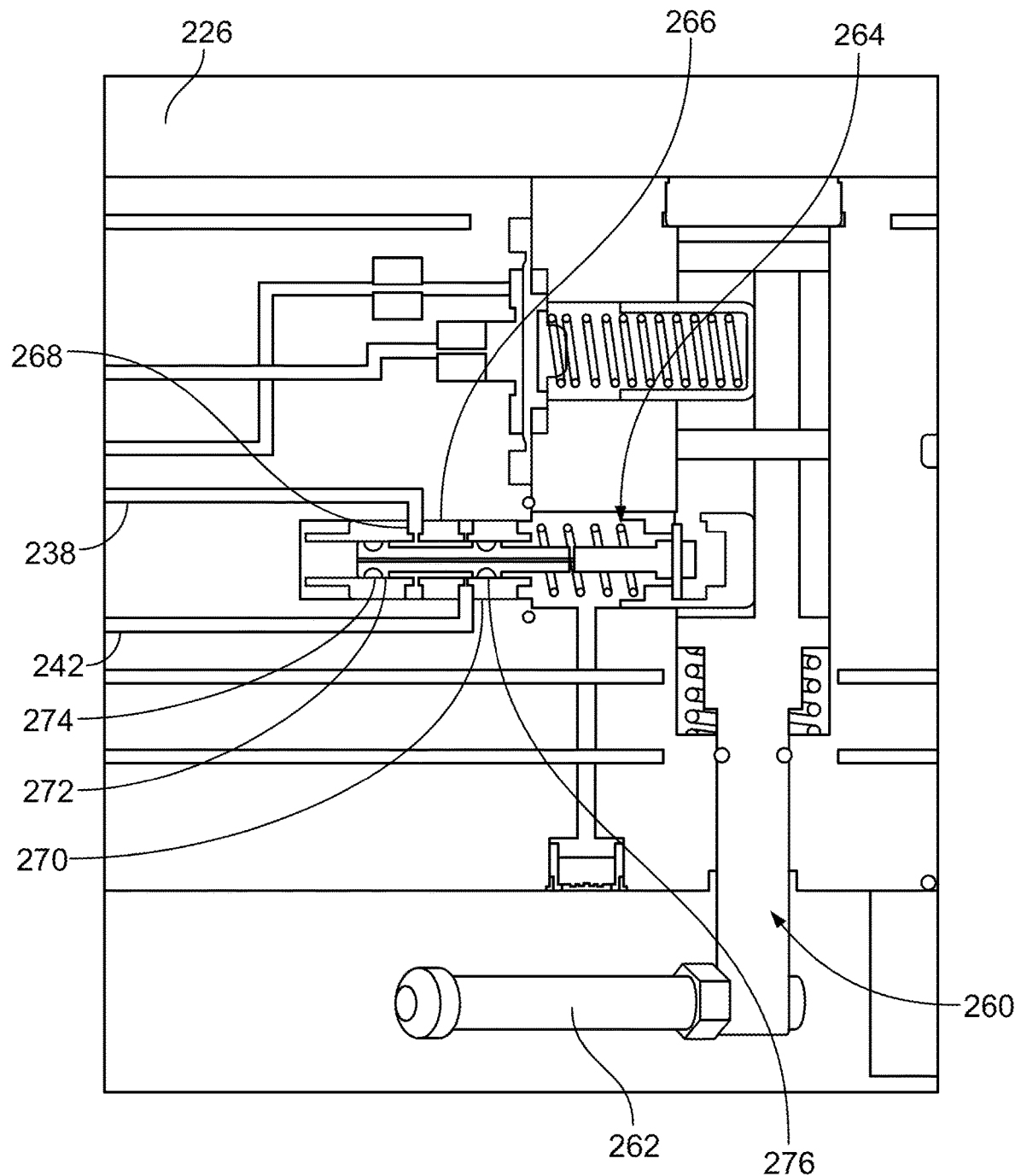
FIG. 16 is a schematic view of a mode switch of the brake distributor valve of FIG. 14.

Referring to FIGS. 6 and 7, the valve member 132 of the SAR valve 130 may be a piston stem 162 having an O-ring 164 that may be in contact with the diaphragm 136. An outer portion 165 of the diaphragm 136 may be connected to the body 112. The piston stem 162 may be received by a bushing 166 having a valve seat 168 for the SAR check valve 138 with the O-ring 164 of the piston stem 162 engaging the inside of the bushing 166. During a brake release, brake cylinder exhaust pressure will feed a first side 170 of the diaphragm 136 of the SAR valve 130 via the brake cylinder exhaust passageway 118. The exhaust choke 134 may be sized to allow for a predetermined increase in pressure buildup on the first side 170 of the diaphragm 136 of the SAR valve 130, which will move the valve member 132 from the first position to the second position. When the valve member 132 may be moved to the second position, the valve member 132 unseats the SAR check valve 138.

Figure 4:
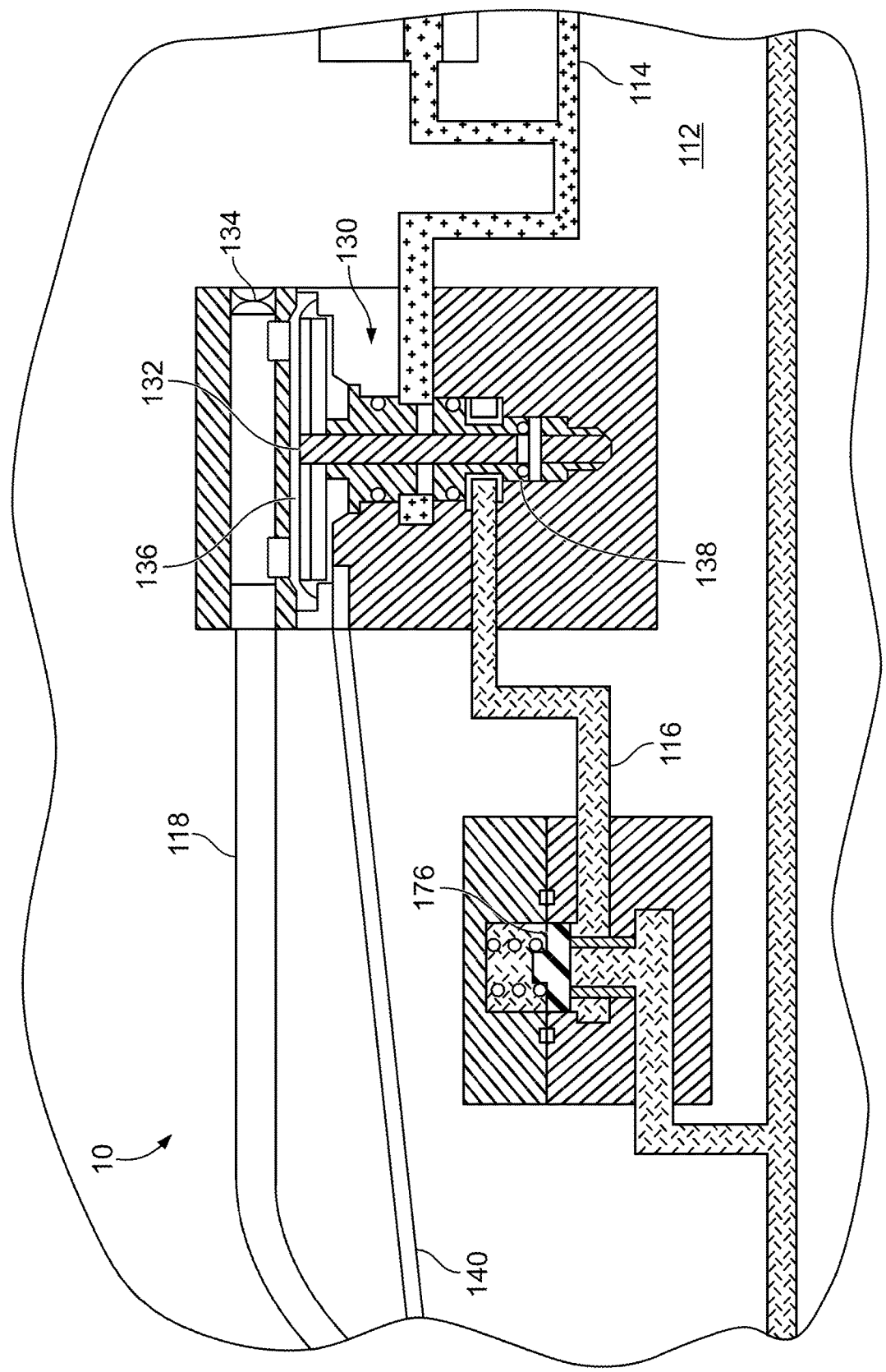
FIG. 4 is a schematic view of a service accelerated release valve according to one embodiment.
Figure 5:
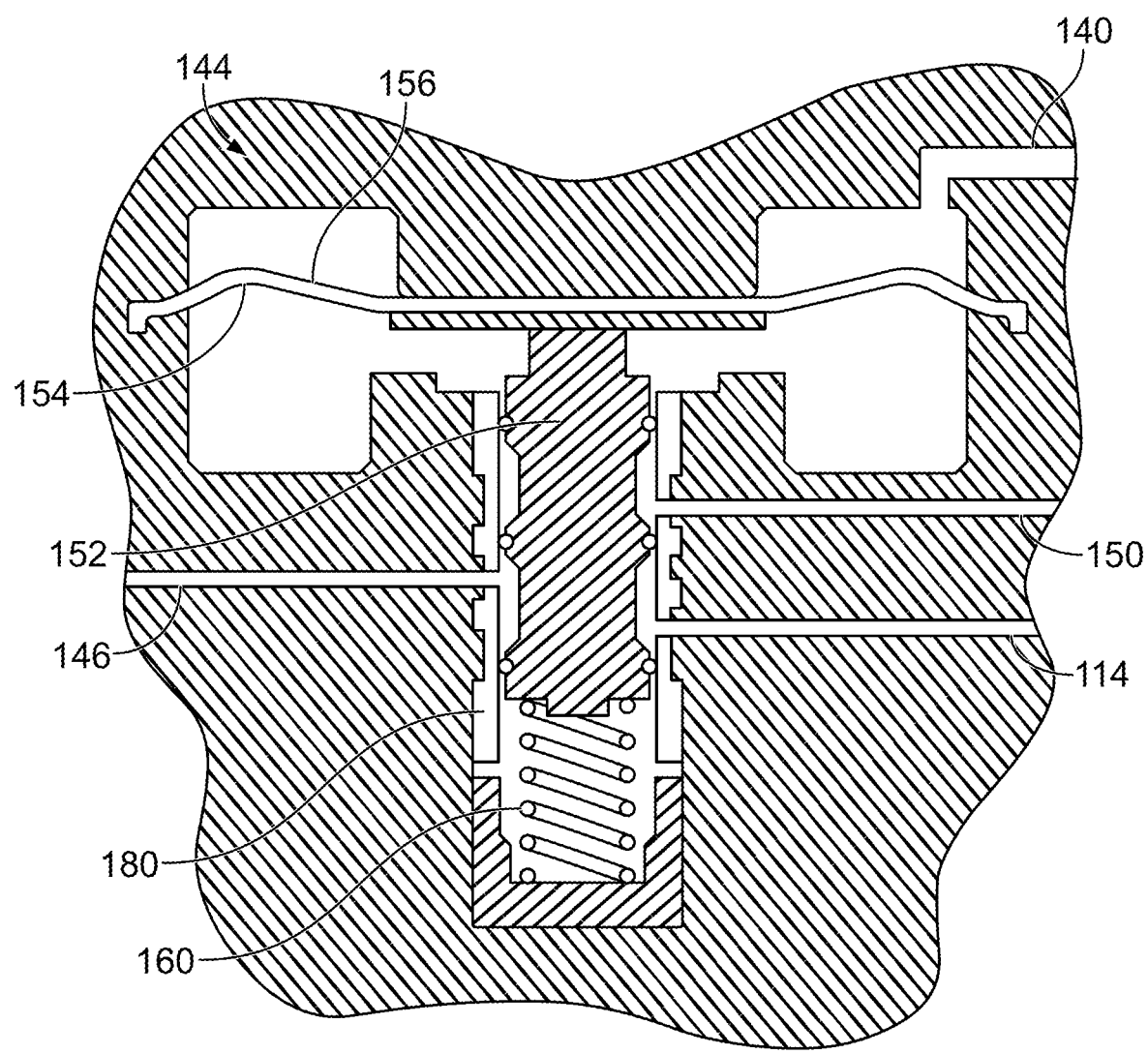
FIG. 5 is a schematic view of a switching valve according to one embodiment.

Referring to FIGS. 4, 6, and 7, the distributor valve 110 further includes a back-flow check valve 176 in fluid communication with the reservoir passageway 116 when then the SAR check valve 138 may be in the open position. The back-flow check valve 176 may prevent flow of air from the brake pipe to the reservoir. The spring force of the back-flow check valve 176 closes the back-flow check valve 176 to ensure brake pipe pressure cannot charge the reservoir through the service accelerated release valve 130. As discussed below, the reservoir may be charged through a separate choked reservoir charging check valve assembly. The back-flow check valve 176 will open when the valve member 132 moves to the second position and opens the SAR check valve 138 to allow the flow of reservoir pressure to the brake pipe.

When the distributor valve 110 of FIGS. 4-7 may be set to direct release mode, the brake pipe pressure will flow through the bushing 166 of the SAR valve 130, around the piston stem 162, unseat the SAR check valve 138, and flow to the top of the back-flow check valve 176. As noted above, the back-flow check valve 176 will remain closed due to the force of the back-flow check valve spring force. During a brake release, brake cylinder exhaust pressure will feed the first side 170 of the diaphragm 136 of the service accelerated release valve 130 via the brake cylinder exhaust passageway 118 to move the valve member 132 from the first position to the second position thereby opening the SAR check valve 138. Reservoir pressure will then flow back into the brake pipe through the SAR valve 130, which, in turn, opens the back-flow check valve 176 to provide an open flow of reservoir pressure directly into the brake pipe. The reservoir pressure flowing directly back into the brake pipe may provide a rapid increase in brake pipe pressure in each freight car's brake pipeline. This function leads directly to higher brake pipe pressure at each car, which allows for recharging of brake pipe pressure to occur at a faster rate. Once the pressure within the brake cylinder exhaust passageway 118 becomes low enough at the first side 170 of the diaphragm 136 of the SAR valve 130, the SAR check valve spring will close the SAR check valve 138 back on its seat thereby moving the valve member 132 from the second position to the first position. Further, the back-flow check valve 176 will also close due to the spring force thereby completing the service accelerated release function.

When the distributor valve 110 may be in the graduated release mode, the brake pipe pressure will flow through the bushing 166, around the piston stem 162, unseat the SAR check valve 138, and to the top side of the back-flow check valve 176. The back-flow check valve 176 may be closed by the force of the spring of the back-flow check valve 176 to ensure that brake pipe pressure cannot charge the reservoir pressure through the SAR valve 130. The brake pipe pressure will flow through a bushing 180 of the switching valve 144, past the spool valve 152, and directly to the second side 148 of the diaphragm 136 of the SAR valve 130. The brake pipe pressure acting on the second side 148 of the diaphragm 136 prohibits the piston stem 162 from moving downwards and the SAR check valve 138 from opening when the pressure in the brake cylinder exhaust passageway 118 builds on the first side 170 of the diaphragm 136 during a brake release when in the graduated release mode.

Referring to FIG. 6, the SAR valve 130 may be incorporated into a main portion 184 and connected to a pipe bracket 186 having a brake pipe port 188 in fluid communication with the brake pipe passageway 114, a signal port 190 in fluid communication with the signal passageway 140, a reservoir port 192 in fluid communication with the reservoir passageway 116, a working chamber port 194, a valve chamber port 196, a brake cylinder port 198, and an additional discharge port 200. Although the SAR valve 130 may be incorporated into a main portion of a distributor valve, other suitable arrangements may be utilized. In addition to the features discussed above, the main portion 184 further includes a reservoir charging check valve 202, a working chamber charging check valve 204, a brake cylinder pressure limiting valve 206, a three-stage brake cylinder control valve 208, a working chamber drain check valve 210, and a quick service limiting valve 212.

Referring to FIGS. 8-14, according to one embodiment the pipe bracket 186 for the brake distributor valve 10, 110 for a vehicle includes a pipe bracket body 220 having a main portion mounting face 222 may receive the main portion 184 of the distributor valve 110, a main-line portion mounting face 224 may receive a main-line portion 226 of the distributor valve 110, and an attachment face 228 may secure the pipe bracket 186 to a vehicle, for example to a car of the vehicle. The attachment face 228 may be a flange with openings for securing the pipe bracket 186 to a vehicle with one or more bolts, although other suitable attachment arrangements may be utilized. The main portion mounting face 222 defines the brake pipe port 188 in fluid communication with the brake pipe passageway 114 of the main portion 184, the signal port 190 in fluid communication with the signal passageway 140 of the main portion 184, the reservoir port 192 in fluid communication with the reservoir passageway 116 of the main portion 184, the working chamber port 194 in fluid communication with a working chamber passageway 230 of the main portion 184, the valve chamber port 196 in fluid communication with a valve chamber passageway 232 of the main portion 184, the brake cylinder port 198 in fluid communication with a brake cylinder passageway 120 of the main portion 184, and the additional discharge channel port 200 in fluid communication of an additional discharge passageway 234 of the main portion 184.

The main-line portion mounting face 224 defines a brake pipe port 236 in fluid communication with a brake pipe passageway 238 of the main-line portion 226, a signal port 240 in fluid communication with a signal passageway 242 of the main-line portion 226, a working chamber port 244 in fluid communication with a working chamber passageway 246 of the main-line portion 226, a valve chamber port 248 in fluid communication with a valve chamber passageway 250 of the main-line portion 226, and an additional discharge channel port 252 in fluid communication of an additional discharge passageway 254 of the main-line portion 226.

Referring to FIGS. 10 and 13-16, the distributor valve 110 includes the main portion 184 described above and the main-line portion 226. Although the main portion 184 shown in FIG. 6 varies somewhat relative to the main portion 184 shown in FIG. 14, the main portion 184 shown in FIG. 14 operates in the same manner as the main portion 184 shown in FIG. 6 and described above. The brake pipe port 236 of the main-line portion mounting face 224 may be in fluid communication with the brake pipe port 188 of the main portion mounting face 222, the signal port 240 of the main-line portion mounting face 224 may be in fluid communication with the signal port 190 of the main portion mounting face 222, the working chamber port 244 of the main-line portion mounting face 224 may be in fluid communication with the working chamber port 194 of the main portion mounting face 222, the valve chamber port 248 of the main-line portion mounting face 224 may be in fluid communication with the valve chamber port 196 of the main portion mounting face 222, and the additional discharge channel port 252 of the main-line portion mounting face 224 may be in fluid communication with the additional discharge channel port 200 of the main portion mounting face 222.

Referring again to FIGS. 13-16, the main-line portion 226 includes a mode switching assembly 260 to switch the main-line portion 226 of the distributor valve 110 between the direct release mode (plain mode) and the graduated release mode (hilly mode) as discussed above. The mode switching assembly 260 may control whether brake pipe pressure may be placed in fluid communication with the signal ports 190, 240 of the pipe bracket 186 and to the signal passageways 140, 242 and the switching valve 144 of the main portion 184. The mode switching assembly 260 includes a handle 262 for manually switching the main-line portion 226 between the direct release mode and the graduated release mode. The mode switching assembly 260 also includes a signal valve assembly 264. In one embodiment, the signal valve assembly 264 of the mode switching assembly 260 may be a spool valve having a bushing 266 defining an input port 268 and an output port 270, a valve body 272, a first O-ring 274, and a second O-ring 276. The input port 268 may be in fluid communication with the brake pipe passageway 238 of the main-line portion 226 and the output port 270 may be in fluid communication with the signal passageway 242 of the main-line portion 226. The signal valve 264 has a first position where the input port 268 may be in fluid communication with the output port 270 and a second position where the input port 268 may be isolated from the output port 270 and the output port 270 may be in fluid communication with ambient atmosphere. More specifically, the second O-ring 276 may allow fluid communication between the input port 268 and the output port 270 and isolate the output port 270 from ambient atmosphere or isolate the input port 268 from the output port 270 and allow fluid communication between the output port 270 and ambient atmosphere based on the position of the valve body 272 and the second O-ring 276. Moving the handle 262 actuates the signal valve 264 between the first position and the second position.

Referring to FIGS. 8-13, the pipe bracket 186 may be configured so that other non-SAR- compatible main portions and non-SAR-compatible main-line portions of a distributor valve for a vehicle can be mounted to the pipe bracket 186. In one embodiment, the non-SAR- compatible main portion and non-SAR-compatible main-line portions may be portions of a distributor valve that does not include a signal passageway and/or does not provide the SAR function described above. The signal port 190 of the main portion mounting face 222 may be positioned to be isolated by a gasket of the non-SAR-compatible main portion of a distributor valve for a vehicle when the non-SAR-compatible main portion may be mounted to the main portion mounting face. Further, the signal port 240 of the main-line portion mounting face 224 may be positioned to be isolated by a gasket of a non-SAR-compatible main-line portion of a distributor valve for a vehicle when the non-SAR-compatible main-line portion may be mounted to the main-line portion mounting face 224. The main portion mounting face 222 defines an x-axis and a y-axis intersecting at a center of the main portion mounting face 222. The main-line portion mounting face 224 defines an x-axis and a y-axis intersecting at a center of the main-line portion mounting face 224.

In one embodiment, a center of the signal port 190 of the main portion mounting face 222 may be positioned at −1.650 inches along the x-axis and −0.900 inch along the y-axis, although other suitable positions may be utilized as detailed below. A diameter of the signal port 190 of the main portion mounting face 222 may be 0.1875 inches, although other suitable sizes may be utilized.

In one embodiment, a center of the signal port 240 of the main-line portion mounting face 224 may be positioned at −1.550 inches along the x-axis and −1.100 inches along the y-axis, although other suitable positions may be utilized as detailed below. A diameter of the signal port 240 of the main-line portion mounting face 224 may be 0.1875 inches, although other suitable sizes may be utilized.

Referring to FIGS. 17-24, the pipe bracket 186 may be configured so that when main portions and main-line portions of KAB and 483A type Russian distributor valves and respective gaskets may be mounted to the pipe bracket 186, the signal ports 190, 240 of the main portion mounting face 222 and the main-line portion mounting face 224 may be isolated, because the main portions and main-line portions of KAB and 483A type Russian distributor valves do not include SAR passageways or SAR functionality. Accordingly, the pipe bracket 186 may be interchangeable with any available main portion and main-line portion for a distributor valve of KAB and 483A type.

Figure 17:
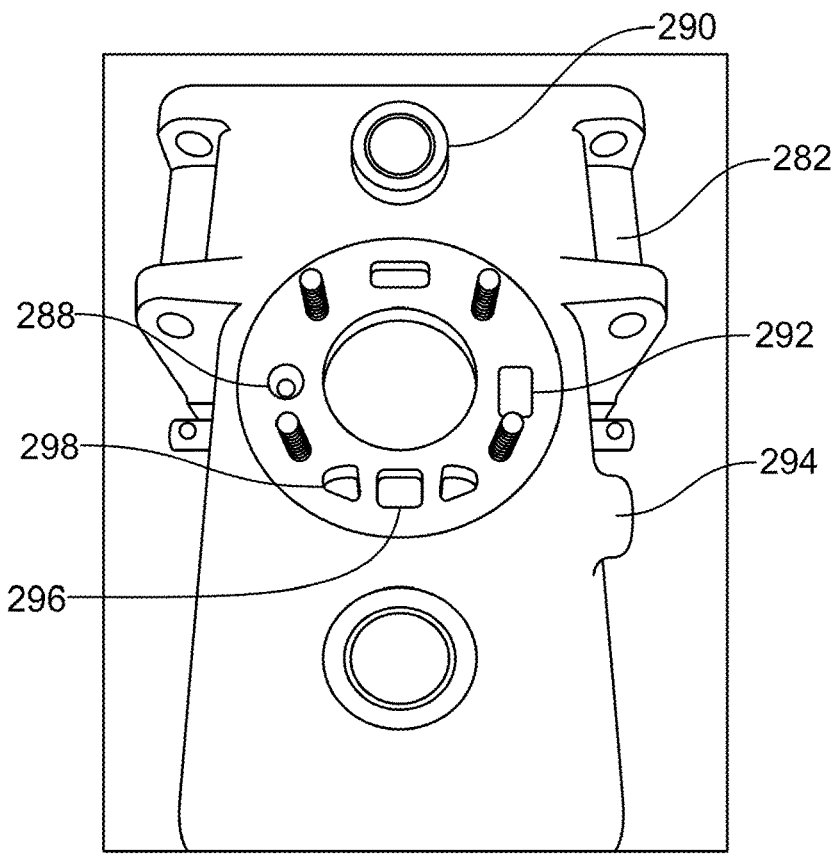
FIG. 17 is a front view of a main portion mounting face of a prior art distributor valve pipe bracket.
Figure 19:
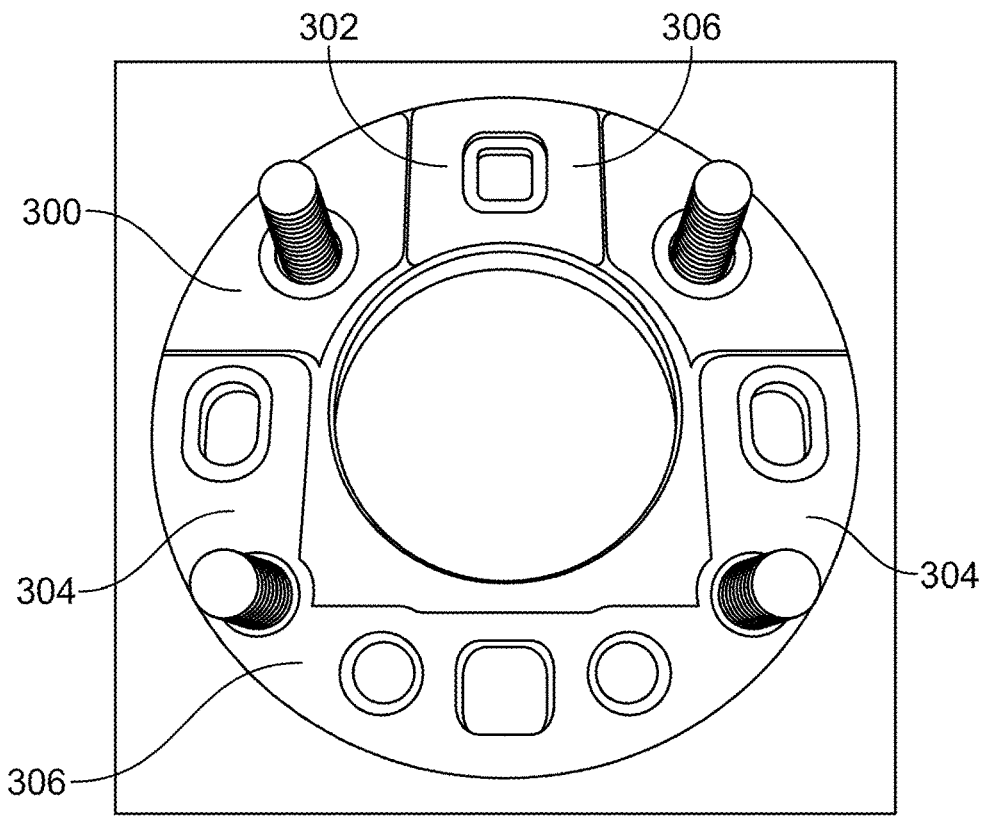
FIG. 19 is a front view of a main portion mounting pipe bracket gasket for the distributor valve of FIGS. 17 and 18.

Referring to FIGS. 17 and 19, the main portion mounting side of a 483A type distributor valve pipe bracket 282 includes a valve chamber port 288, a working chamber port 290, an additional discharge channel port 292, a reservoir port 294, a brake cylinder port 296, and a brake pipe port 298, which correspond to respective ports of the main portion body. The main portion mounting pipe bracket gasket 300 for the 483A type main portion also includes a first region 302 and a second region 304, each defined by raised portions 306 of the gasket 300 that may abut and seal against a pipe bracket such as pipe bracket 186. When the gasket 300 may be mounted to the pipe bracket 186, the signal port 190 (FIG. 12) of the main portion mounting face 222 of the pipe bracket 186 may be positioned within the second region 304 of the gasket 300 thereby sealing and isolating the signal port 190, although the signal port 190 of the main portion mounting face 222 could also be positioned in the first region 302 with a corresponding movement of the position of the signal passageway 140 of the main portion 184 of the distributor valve 110 discussed above.

Figure 18:
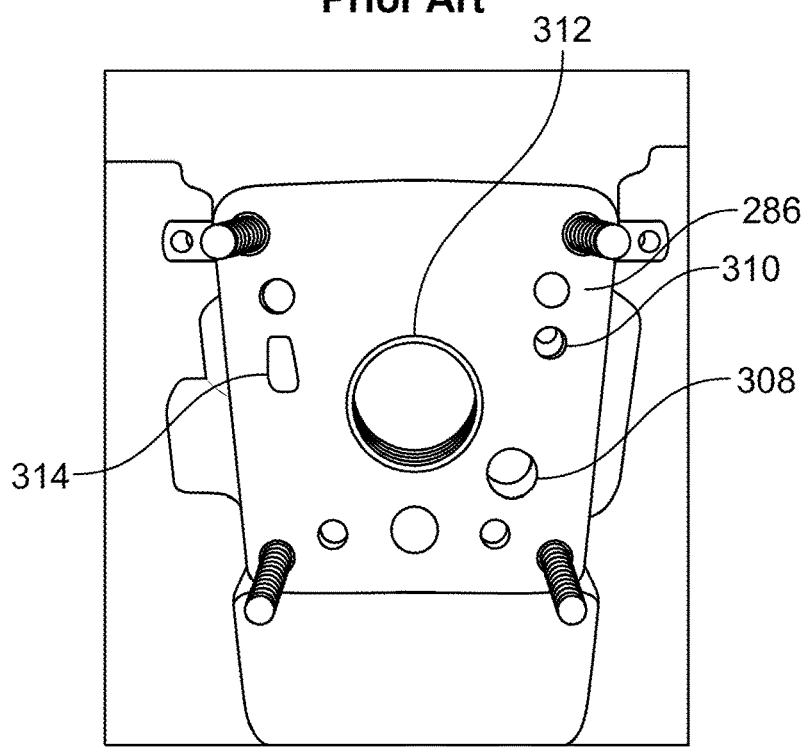
FIG. 18 is a front view of the main-line portion mounting face of the prior art distributor valve pipe bracket of FIG. 17.
Figure 20:
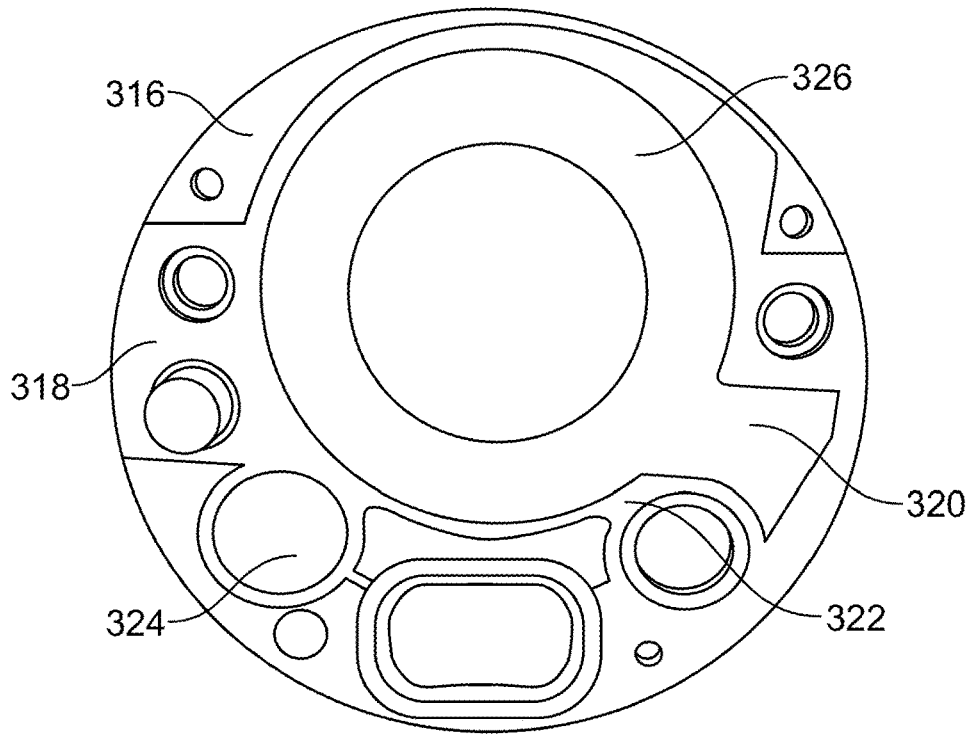
FIG. 20 is a front view of a main-line portion mounting pipe bracket gasket according to one embodiment for the distributor valve of FIGS. 17 and 18.

Referring to FIGS. 18 and 20, the main-line portion mounting side of a 483A type distributor valve pipe bracket 286 includes a valve chamber port 308, a working chamber port 310, a brake pipe port 312, and an additional discharge channel port 314, which correspond to respective ports of the main-line portion body. Referring to FIG. 20, the main-line portion mounting pipe bracket gasket 316 for the 483A type main-line portion also includes a first region 318, a second region 320, a third region 322, and a fourth region 324. Each may be defined by raised portions 326 of the gasket 316 that may abut and seal against a pipe bracket. When the gasket 316 may be mounted to the pipe bracket 186, the signal port 240 of the main-line portion mounting face 224 (FIG. 13) of the pipe bracket 186 may be positioned within the fourth region 324 thereby sealing and isolating the signal port 240, although the signal port 240 of the main-line portion mounting face 224 could be positioned in the first through third regions 318, 320, 322 with a corresponding movement of the position of the signal passageway 242 of the main-line portion 226 of the distributor valve 110 discussed above.

Figure 21:
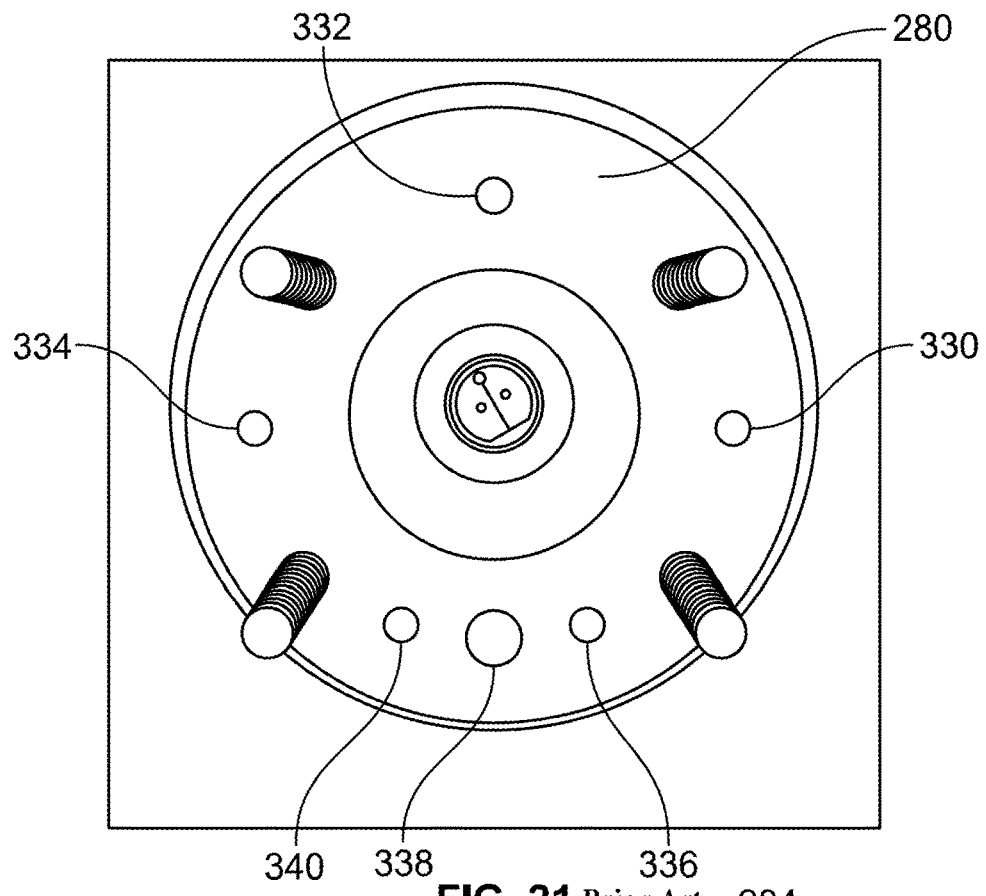
FIG. 21 is a front view of a main portion mounting face of a prior art distributor valve.
Figure 23:
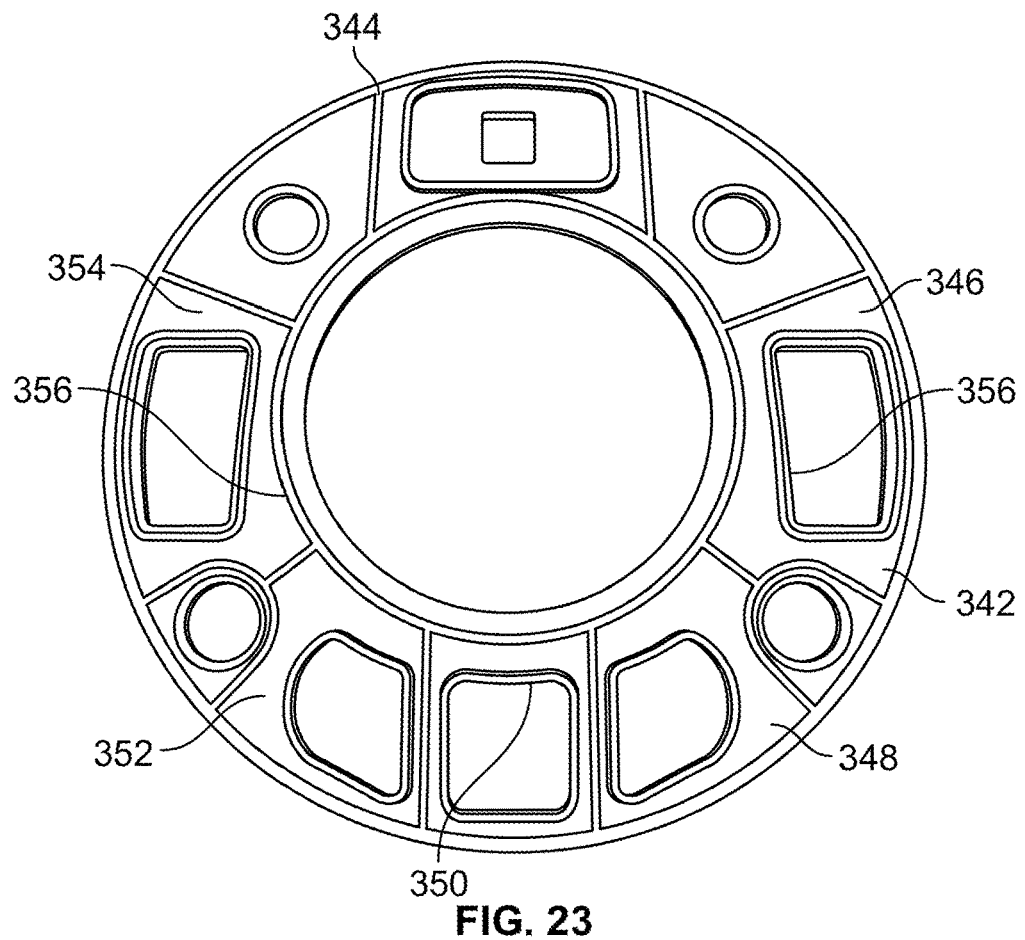
FIG. 23 is a front view of a main portion mounting pipe bracket gasket according to one embodiment for the distributor valve of FIGS. 21 and 22.

Referring to FIGS. 21 and 23, the main portion mounting side of a KAB type distributor valve pipe bracket 280 includes a valve chamber port 330, a working chamber port 332, an additional discharge channel port 334, a reservoir port 336, a brake cylinder port 338, and a brake pipe port 340. The main portion mounting pipe bracket gasket 342 for the KAB type distributor valve main portion also includes a first region 344, a second region 346, a third region 348, a fourth region 350, a fifth region 352, and a sixth region 354. Each may be defined by a raised bead 356 of the gasket 342 that may abut and seal against a pipe bracket, such as pipe bracket 186. When the gasket 342 may be mounted to the pipe bracket 186, the signal port 190 (FIG. 12) of the main portion mounting face 222 of the pipe bracket 186 may be positioned within the sixth region 354 of the gasket 342 thereby sealing and isolating the signal port 190, although the signal port 190 of the main portion mounting face 222 could also be positioned in the first through fifth regions 344, 346, 348, 350, 352 with a corresponding movement of the position of the signal passageway 190 of the main portion 184 of the distributor valve 110 discussed above.

Figure 22:
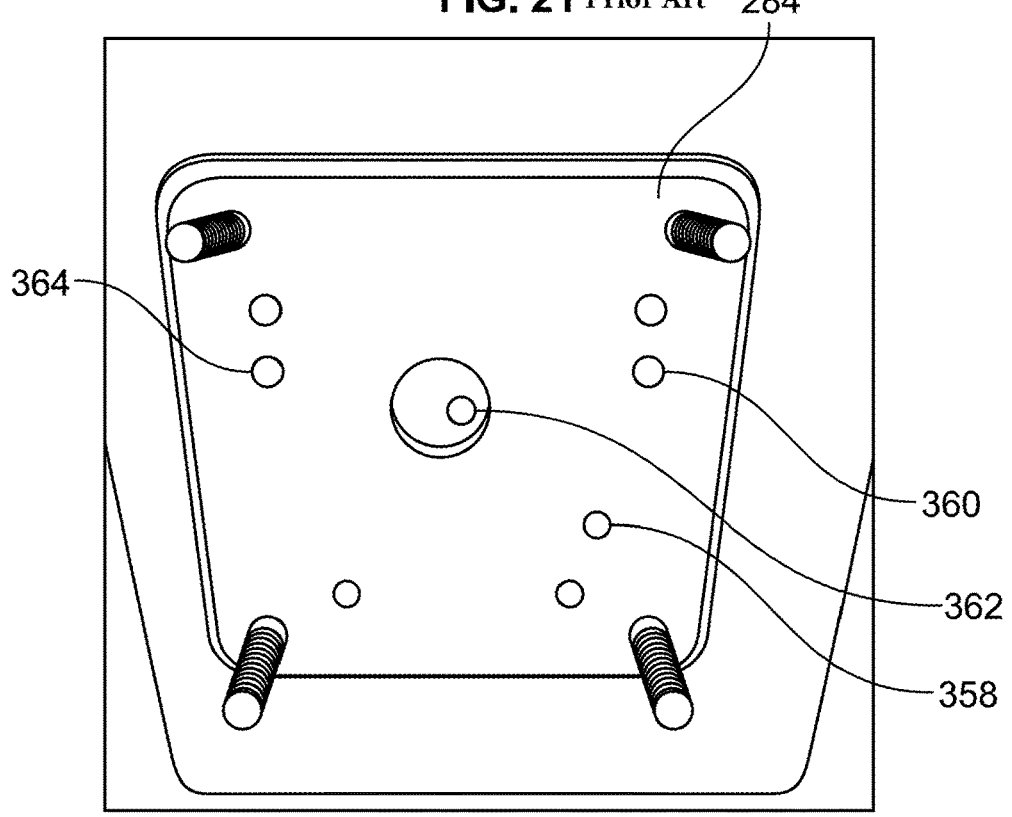
FIG. 22 is a front view of the main-line portion mounting face of the prior art distributor valve of FIG. 21.
Figure 24:
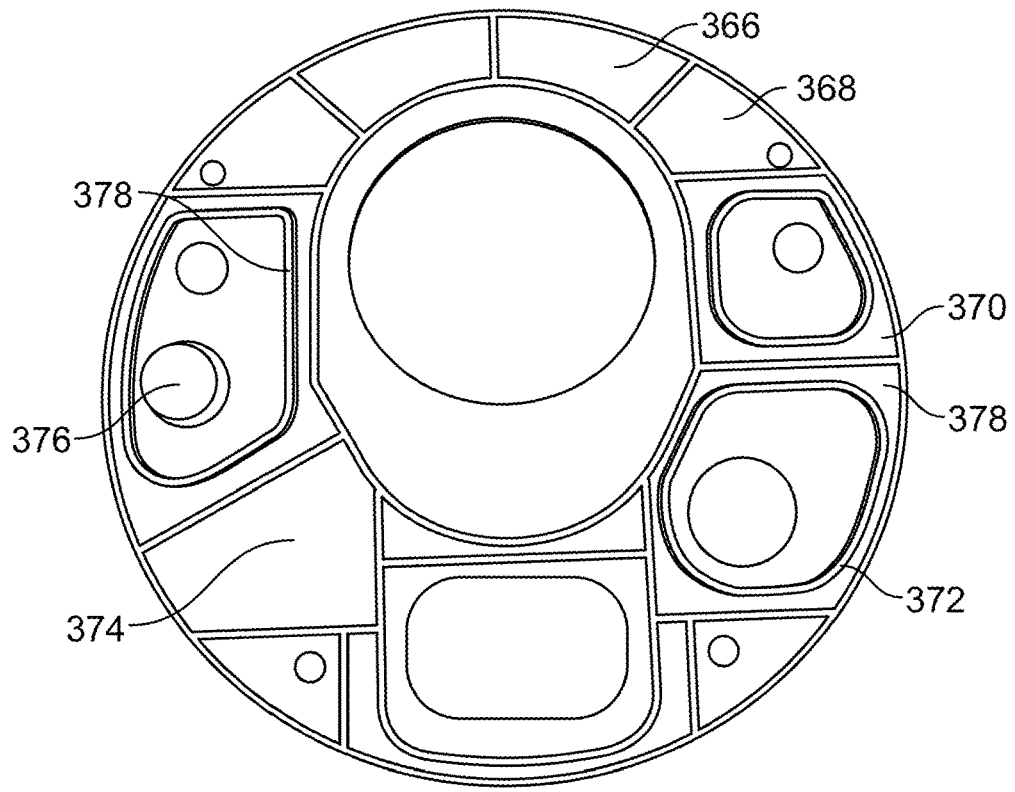
FIG. 24 is a front view of a main-line portion mounting pipe bracket gasket according to one embodiment for the distributor valve of FIGS. 21 and 22.

Referring to FIGS. 22 and 24, the main-line portion mounting side of a KAB type distributor valve pipe bracket 284 includes a valve chamber port 358, a working chamber port 360, a brake pipe port 362, and an additional discharge channel port 364, which correspond to the respective ports of the main-line portion body. The main-line portion mounting pipe bracket gasket 366 for the KAB type main-line portion also includes a first region 368, a second region 370, a third region 372, a fourth region 374, and a fifth region 376. Each may be defined by a raised bead 378 of the gasket that may abut and seal against a pipe bracket, such as pipe bracket 186. When the gasket 366 may be mounted to the pipe bracket 186, the signal port 240 (FIG. 13) of the main-line portion mounting face 224 of the pipe bracket 186 may be positioned within the fourth region 374, although the signal port 240 of the main-line portion mounting face 224 could also be positioned in the first through third regions 368, 370, 372 and the fifth region 376 with a corresponding movement of the position of the signal passageway 242 (FIG. 16) of the main-line portion 226 of the distributor valve 110 discussed above. Although the signal passageway 140 of the main portion 184 and the signal passageway 242 of the main-line portion 226 may be connected to each other via the signal portions 190, 240 of the pipe bracket 186, the main portion 184 and the main-line portion 226 may also include pressure ports to access the pressure of the signal passageways 140, 242 to allow a direct connection of the signal passageways 140, 242 of the main portion 184 and main-line portion 226. In particular, such pressure ports on the outside of the main portion 184 and the main-line portion 226 may be connected via suitable fittings and lines or hoses to allow the main portion 184 and main-line portion 226 to provide SAR functionality even when connected to a conventional freight brake pipe bracket, such as a KAB30 or 295M pipe brackets.

A pipe bracket for a brake distributor valve for a vehicle may include a pipe bracket body including a main portion mounting face may receive a main portion of the distributor valve. A main-line portion mounting face may receive a main-line portion of the distributor valve. An attachment face may secure the pipe bracket to a vehicle. The main portion mounting face may define a first signal port in fluid communication with a first signal passageway of the main portion, and the main-line portion mounting face may define a second signal port in fluid communication with a second signal passageway of the main-line portion.

Optionally, the main portion mounting face may define a second brake pipe port in fluid communication with a first brake pipe passageway of the main portion. A first signal port may be in fluid communication with a first signal passageway of the main portion and a reservoir port may be in fluid communication with a reservoir passageway of the main portion. A first working chamber port may be in fluid communication with a first working chamber passageway of the main portion, a first valve chamber port may be in fluid communication with a first valve chamber passageway of the main portion, and a brake cylinder port may be in fluid communication with a brake cylinder passageway of the main portion. A first additional discharge channel port may be in fluid communication with a first additional discharge passageway of the main portion. The main-line portion mounting face may define a second brake pipe port in fluid communication with a second brake pipe passageway of the main-line portion. A second signal port may be in fluid communication with a second signal passageway of the main-line portion, a second working chamber port may be in fluid communication with a second working chamber passageway of the main-line portion, a second valve chamber port may be in fluid communication with a second valve chamber passageway of the main-line portion, and a second additional discharge channel port may be in fluid communication with a second additional discharge passageway of the main-line portion.

Optionally, the second brake pipe port of the main-line portion mounting face may be in fluid communication with the first brake pipe port of the main portion mounting face, the second signal port of the main-line portion mounting face may be in fluid communication with the first signal port of the main portion mounting face, and the second working chamber port of the main-line portion mounting face may be in fluid communication with the first working chamber port of the main portion mounting face. The second valve chamber port of the main-line portion mounting face may be in fluid communication with the first valve chamber port of the main portion mounting face and the second additional discharge channel port of the main-line portion mounting face may be in fluid communication with the first additional discharge channel port of the main portion mounting face.

Optionally, the first signal port of the main portion mounting face may be isolated by a gasket of the main portion of the distributor valve when the main portion may be mounted to the main portion mounting face. Optionally, the second signal port of the main-line portion mounting face may be configured and positioned to be isolated by a gasket of the main-line portion of the distributor valve when the main-line portion may be mounted to the main-line portion mounting face. Optionally, the main portion mounting face may define an x-axis and a y-axis intersecting at a center of the main portion mounting face, a center of the first signal port of the main portion mounting face may be positioned at −1.650 inches along the x-axis and −0.900 inch along the y-axis. Optionally, a diameter of the first signal port of the main portion mounting face may be 0.1875 inches. Optionally, the main-line portion mounting face may define an x-axis and a y-axis intersecting at a center of the main-line portion mounting face, a center of the second signal port of the main-line portion mounting face may be positioned at −1.550 inches along the x-axis and −1.100 inches along the y-axis.

Optionally, a diameter of the second signal port of the main-line portion mounting face may be 0.1875 inches. A brake distributor valve for a vehicle may include a main portion including a first brake pipe passageway, a first signal passageway, a first reservoir passageway, a first working chamber passageway, a first valve chamber passageway, a first brake cylinder passageway, and a first additional discharge channel passageway. The brake distributor valve may also include a main-line portion comprising a second brake pipe passageway, a second signal passageway, a second working chamber passageway, a second valve chamber passageway, and a second additional discharge channel passageway. The brake distributor valve may further include a pipe bracket body including a main portion mounting face may receive the main portion of the distributor valve, a main-line portion mounting face may receive the main-line portion of the distributor valve, and an attachment face may secure the pipe bracket to the vehicle. The main portion mounting face may define a first brake pipe port in fluid communication with the first brake pipe passageway of the main portion, a first signal port in fluid communication with the first signal passageway of the main portion, a first reservoir port in fluid communication with the first reservoir passageway of the main portion, a first working chamber port in fluid communication with the first working chamber passageway of the main portion, a first valve chamber port in fluid communication with the first valve chamber passageway of the main portion, a first brake cylinder port in fluid communication with the first brake cylinder passageway of the main portion, and a first additional discharge channel port in fluid communication of the additional discharge passageway of the main portion. The main-line portion mounting face may define a second brake pipe port in fluid communication with the second brake pipe passageway of the main-line portion, a second signal port in fluid communication with the second signal passageway of the main-line portion, a second working chamber port in fluid communication with the second working chamber passageway of the main-line portion, a second valve chamber port in fluid communication with the second valve chamber passageway of the main-line portion, and a second additional discharge channel port in fluid communication of the second additional discharge passageway of the main-line portion.

Optionally, the second brake pipe port of the main-line portion may be in fluid communication with the first brake pipe port of the main portion, the second signal port of the main-line portion may be in fluid communication with the first signal port of the main portion, the second working chamber port of the main-line portion may be in fluid communication with the first working chamber port of the main portion, the second valve chamber port of the main-line portion may be in fluid communication with the first valve chamber port of the main portion, and the second additional discharge channel port of the main-line portion may be in fluid communication with the second additional discharge channel port of the main portion.

Optionally, the first signal port of the main portion mounting face may be isolated by a gasket when the main portion may be mounted to the main portion mounting face. Optionally, the signal port of the main-line portion mounting face may be isolated by a gasket when the main-line portion may be mounted to the main-line portion mounting face.

Optionally, the main portion mounting face may define an x-axis and a y-axis intersecting at a center of the main portion mounting face, a center of the signal port of the main portion mounting face may be positioned at −1.650 inches along the x-axis and −0.900 inch along the y-axis. Optionally, a diameter of the signal port of the main portion mounting face may be 0.1875 inches. Optionally, the main-line portion mounting face may define an x-axis and a y-axis intersecting at a center of the main-line portion mounting face, a center of the signal port of the main-line portion mounting face may be positioned at −1.550 inches along the x-axis and −1.100 inches along the y-axis. Optionally, a diameter of the signal port of the main-line portion mounting face may be 0.1875 inches. A gasket for a distributor valve for a vehicle may include a first region may seal and isolate a signal port of a pipe bracket when a main portion or a main-line portion of the distributor valve may be connected to a main portion mounting face or a main-line portion face, respectively, of the pipe bracket.

Optionally, the gasket may further include a valve chamber port may seal and isolate a valve chamber port of the main portion or the main-line portion of the distributor valve, a working chamber port may seal and isolate a working chamber port of the main portion or the main-line portion of the distributor valve, an additional discharge channel port may seal and isolate an additional discharge channel port of the main portion or the main-line portion of the distributor valve, and a brake pipe port may seal and isolate a brake pipe port of the main portion or the main-line portion of the distributor valve when the main portion or the main-line portion of the distributor valve may be connected to the main portion mounting face or the main-line portion mounting face, respectively, of the pipe bracket. Optionally, further the gasket may further include a reservoir port configured to seal and isolate a reservoir port of the main portion. Optionally, the valve chamber port, the working chamber port, the additional discharge channel port, and the brake pipe port are separated by raised beads.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A pipe bracket for a brake distributor valve for a vehicle, comprising:
    a pipe bracket body including a main portion mounting face configured to receive a main portion of the distributor valve;
    a main-line portion mounting face configured to receive a main-line portion of the distributor valve; and
    an attachment face configured to secure the pipe bracket to a vehicle, wherein the main portion mounting face defines a first signal port configured to be in fluid communication with a first signal passageway of the main portion, and the main-line portion mounting face defines a second signal port configured to be in fluid communication with a second signal passageway of the main-line portion,
    wherein the first signal port of the main portion mounting face is configured to be in fluid communication with the second signal port of the main-line portion mounting face,
    wherein the main portion mounting face defines a first brake pipe port configured to be in fluid communication with a first brake pipe passageway of the main portion, a reservoir port configured to be in fluid communication with a reservoir passageway of the main portion, a first working chamber port configured to be in fluid communication with a first working chamber passageway of the main portion, a first valve chamber port configured to be in fluid communication with a first valve chamber passageway of the main portion, a brake cylinder port configured to be in fluid communication with a brake cylinder passageway of the main portion, and a first additional discharge channel port configured to be in fluid communication with a first additional discharge passageway of the main portion, and
    the main-line portion mounting face defines a second brake pipe port configured to be in fluid communication with a second brake pipe passageway of the main-line portion, a second working chamber port configured to be in fluid communication with a second working chamber passageway of the main-line portion, a second valve chamber port configured to be in fluid communication with a second valve chamber passageway of the main-line portion, and a second additional discharge channel port configured to be in fluid communication with a second additional discharge passageway of the main-line portion.

2. The pipe bracket of claim 1, wherein the second brake pipe port of the main-line portion mounting face is in fluid communication with a first brake pipe port of the main portion mounting face, the second working chamber port of the main-line portion mounting face is in fluid communication with the first working chamber port of the main portion mounting face, the second valve chamber port of the main-line portion mounting face is in fluid communication with the first valve chamber port of the main portion mounting face, and the second additional discharge channel port of the main-line portion mounting face is in fluid communication with the first additional discharge channel port of the main portion mounting face.

3. The pipe bracket of claim 1, wherein the first signal port of the main portion mounting face is configured and positioned to be isolated by a gasket of the main portion of the distributor valve when the main portion is mounted to the main portion mounting face.

4. The pipe bracket of claim 1, wherein the second signal port of the main-line portion mounting face is configured and positioned to be isolated by a gasket of the main-line portion of the distributor valve when the main-line portion is mounted to the main-line portion mounting face.

5. The pipe bracket of claim 1, wherein the main portion mounting face defines an x-axis and a y-axis intersecting at a center of the main portion mounting face, a center of the first signal port of the main portion mounting face is positioned at −1.650 inches along the x-axis and −0.900 inch along the y-axis.

6. The pipe bracket of claim 5, wherein a diameter of the first signal port of the main portion mounting face is 0.1875 inches.

7. The pipe bracket of claim 5, wherein the main-line portion mounting face defines an x-axis and a y-axis intersecting at a center of the main-line portion mounting face, a center of the second signal port of the main-line portion mounting face is positioned at −1.550 inches along the x-axis and −1.100 inches along the y-axis.

8. The pipe bracket of claim 7, wherein a diameter of the second signal port of the main-line portion mounting face is 0.1875 inches.

9. A brake distributor valve for a vehicle, comprising:
a main portion comprising a first brake pipe passageway, a first signal passageway, a first reservoir passageway, a first working chamber passageway, a first valve chamber passageway, a first brake cylinder passageway, and a first additional discharge channel passageway;
a main-line portion comprising a second brake pipe passageway, a second signal passageway, a second working chamber passageway, a second valve chamber passageway, and a second additional discharge channel passageway; and
a pipe bracket body comprising a main portion mounting face configured to receive the main portion of the distributor valve, a main-line portion mounting face configured to receive the main-line portion of the distributor valve, and an attachment face configured to secure the pipe bracket to the vehicle, and
the main portion mounting face defines a first brake pipe port configured to be in fluid communication with the first brake pipe passageway of the main portion, a first signal port configured to be in fluid communication with the first signal passageway of the main portion, a first reservoir port configured to be in fluid communication with the first reservoir passageway of the main portion, a first working chamber port configured to be in fluid communication with the first working chamber passageway of the main portion, a first valve chamber port configured to be in fluid communication with the first valve chamber passageway of the main portion, a first brake cylinder port configured to be in fluid communication with the first brake cylinder passageway of the main portion, and a first additional discharge channel port configured to be in fluid communication of the first additional discharge passageway of the main portion, and the main-line portion mounting face further defines a second brake pipe port configured to be in fluid communication with the second brake pipe passageway of the main-line portion, a second signal port configured to be in fluid communication with the second signal passageway of the main-line portion, a second working chamber port configured to be in fluid communication with the second working chamber passageway of the main-line portion, a second valve chamber port configured to be in fluid communication with the second valve chamber passageway of the main-line portion, and a second additional discharge channel port configured to be in fluid communication of the second additional discharge passageway of the main-line portion.

10. The brake distributor valve of claim 9, wherein the second brake pipe port of the main-line portion is in fluid communication with the first brake pipe port of the main portion, the second signal port of the main-line portion is in fluid communication with the first signal port of the main portion, the second working chamber port of the main-line portion is in fluid communication with the first working chamber port of the main portion, the second valve chamber port of the main-line portion is in fluid communication with the first valve chamber port of the main portion, and the second additional discharge channel port of the main-line portion is in fluid communication with the second additional discharge channel port of the main portion.

11. The brake distributor valve of claim 9, wherein the first signal port of the main portion mounting face is configured and positioned to be isolated by a gasket when the main portion is mounted to the main portion mounting face and the second signal port of the main-line portion mounting face is configured and positioned to be isolated by a gasket when the main-line portion is mounted to the main-line portion mounting face.

12. The brake distributor valve of claim 9, wherein the main portion mounting face defines an x-axis and a y-axis intersecting at a center of the main portion mounting face, a center of the first signal port of the main portion mounting face is positioned at −1.650 inches along the x-axis and −0.900 inch along the y-axis.

13. The brake distributor valve of claim 12, wherein a diameter of the first signal port of the main portion mounting face is 0.1875 inches.

14. The brake distributor of claim 12, wherein the main-line portion mounting face defines an x-axis and a y-axis intersecting at a center of the main-line portion mounting face, a center of the second signal port of the main-line portion mounting face is positioned at −1.550 inches along the x-axis and −1.100 inches along the y-axis.

15. The brake distributor valve of claim 14, wherein a diameter of the second signal port of the main-line portion mounting face is 0.1875 inches.

16. A pipe bracket for a distributor valve of a vehicle, the pipe bracket comprising:
- a pipe bracket body including a main portion mounting face configured to receive a main portion of the distributor valve;
- a main-line portion mounting face configured to receive a main-line portion of the distributor valve;
- an attachment face configured to secure the pipe bracket to a vehicle, the main portion mounting face defining a first signal port configured to be in fluid communication with a first signal passageway of the main portion, the main-line portion mounting face defining a second signal port configured to be in fluid communication with a second signal passageway of the main-line portion, wherein the first signal port of the main portion mounting face is configured to be in fluid communication with the second signal port of the main-line portion mounting face; and
- a gasket having a first region configured to seal and isolate one or both of the first signal port or the second signal port defined by the main portion mounting face while the main portion or the main-line portion is configured to be connected to the main portion mounting face or the main-line portion face, respectively, of the pipe bracket, wherein the gasket also includes a valve chamber port configured to seal and isolate a valve chamber port of the main portion or the main-line portion of the distributor valve, a working chamber port configured to seal and isolate a working chamber port of the main portion or the main-line portion of the distributor valve, an additional discharge channel port configured to seal and isolate an additional discharge channel port of the main portion or the main-line portion of the distributor valve, and a brake pipe port configured to seal and isolate a brake pipe port of the main portion or the main-line portion of the distributor valve when the main portion or the main-line portion of the distributor valve is connected to the main portion mounting face or the main-line portion mounting face, respectively, of the pipe bracket.

17. The pipe bracket of claim 16, wherein the gasket includes a reservoir port configured to seal and isolate a reservoir port of the main portion.

18. The pipe bracket of claim 16, wherein the valve chamber port, the working chamber port, the additional discharge channel port, and the brake pipe port are separated by raised beads.

* * * * *